US011486653B2

(12) United States Patent
Starks, Jr. et al.

(10) Patent No.: US 11,486,653 B2
(45) Date of Patent: Nov. 1, 2022

(54) LOW PROFILE SUPPORT STRUCTURE FOR A ROTARY REGENERATIVE HEAT EXCHANGER

(71) Applicant: Arvos Ljungstrom LLC, Wellsville, NY (US)

(72) Inventors: William J. Starks, Jr., Wellsville, NY (US); Adam C. Sorochin, Wellsville, NY (US); Kevin O'Boyle, Alma, NY (US)

(73) Assignee: Arvos Ljungstrom LLC, Wellsville, NY (US)

( * ) Notice: Subject to any disclaimer, the term of this patent is extended or adjusted under 35 U.S.C. 154(b) by 0 days.

(21) Appl. No.: 17/609,923

(22) PCT Filed: May 10, 2019

(86) PCT No.: PCT/US2019/031701
§ 371 (c)(1),
(2) Date: Nov. 9, 2021

(87) PCT Pub. No.: WO2020/231381
PCT Pub. Date: Nov. 19, 2020

(65) Prior Publication Data
US 2022/0146208 A1    May 12, 2022

(51) Int. Cl.
F28D 19/04    (2006.01)
F28F 9/00    (2006.01)
F28F 9/007    (2006.01)

(52) U.S. Cl.
CPC ......... *F28D 19/042* (2013.01); *F28D 19/048* (2013.01); *F28F 9/001* (2013.01); *F28F 9/007* (2013.01)

(58) Field of Classification Search
CPC .... F28D 19/042; F28D 19/048; F28D 19/041; F28F 9/001; F28F 9/007
(Continued)

(56) References Cited

U.S. PATENT DOCUMENTS

| | | | |
|---|---|---|---|
| 3,088,518 A * | 5/1963 | Walker | F28D 19/047 |
| | | | 165/9 |
| 3,267,562 A * | 8/1966 | Casagrande | F28D 19/044 |
| | | | 29/469 |

(Continued)

FOREIGN PATENT DOCUMENTS

| | | |
|---|---|---|
| AT | 315344 B | 5/1974 |
| FR | 1054037 A | 2/1954 |
| GB | 649265 | 12/1948 |

OTHER PUBLICATIONS

International Search Report and Written Opinion issued in corresponding PCT Application No. PCT/US2019/031701, dated Jan. 22, 2020, pp. 1-10.

(Continued)

*Primary Examiner* — Jon T. Schermerhorn, Jr.
(74) *Attorney, Agent, or Firm* — Robinson & Cole LLP

(57) ABSTRACT

A support structure for a rotary regenerative heat exchanger includes an upper section, a lower section, and a plurality of support members. The upper section includes an upper ring having a first exterior surface, an upper hub and at least three upper spokes each extending between and secured at respective ends thereof to the upper ring and the upper hub. Each of the plurality of support members are fixedly secured, directly or indirectly, to the upper ring and the lower section. An annular space is between the upper ring and the lower ring, which is configured to receive compartments of a rotor assembly. The upper hub, the upper spokes and the support members cooperate to provide rigidity to the support structure by cooperating to support and transmit the weight of the upper spokes, the upper ring and the upper hub to the lower section.

21 Claims, 16 Drawing Sheets

(58) Field of Classification Search
USPC .............................................................. 165/9
See application file for complete search history.

(56) References Cited

U.S. PATENT DOCUMENTS

| | | | | |
|---|---|---|---|---|
| 4,063,587 A * | 12/1977 | Stockman | ............. | F28D 19/042 |
| | | | | 165/8 |
| 4,124,063 A * | 11/1978 | Stockman | ............. | F28D 19/047 |
| | | | | 165/DIG. 21 |
| 4,960,166 A * | 10/1990 | Hirt | ....................... | F28D 19/044 |
| | | | | 165/8 |
| 5,628,360 A * | 5/1997 | Brophy | ................. | F28D 19/047 |
| | | | | 165/DIG. 21 |
| 5,655,594 A * | 8/1997 | Wonderling | .......... | F28D 19/041 |
| | | | | 165/8 |
| 6,091,061 A * | 7/2000 | Dreisler | ................ | F28D 19/047 |
| | | | | 165/8 |
| 6,237,674 B1 * | 5/2001 | Larkin | .................. | F28D 19/047 |
| | | | | 165/8 |
| 6,260,607 B1 * | 7/2001 | Finnemore | ............ | F28D 19/047 |
| | | | | 165/8 |

OTHER PUBLICATIONS

International Report on Patentability issued in corresponding PCT Application No. PCT/US2019/031701, dated Aug. 3, 2021, pp. 1-16.

* cited by examiner

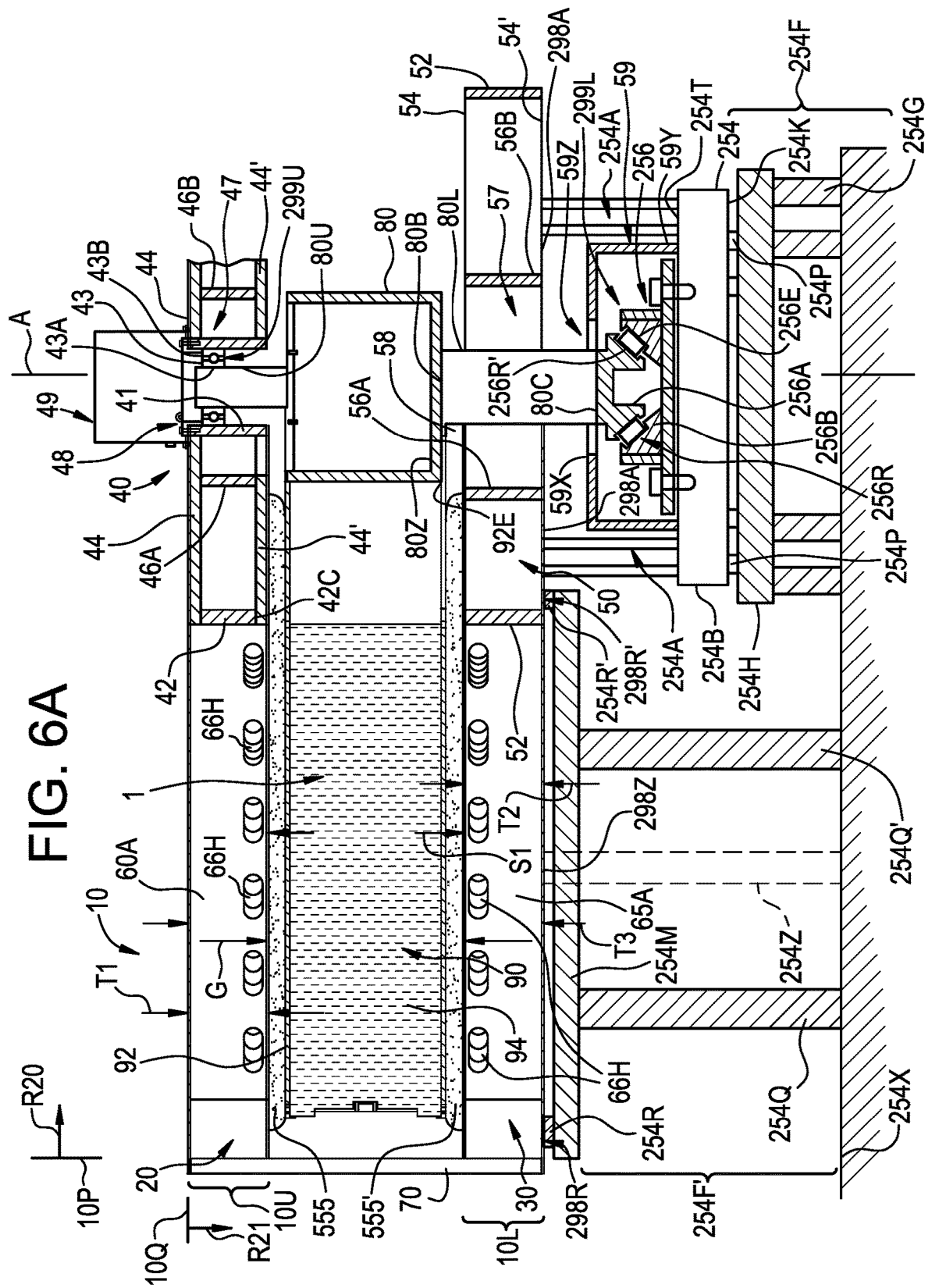

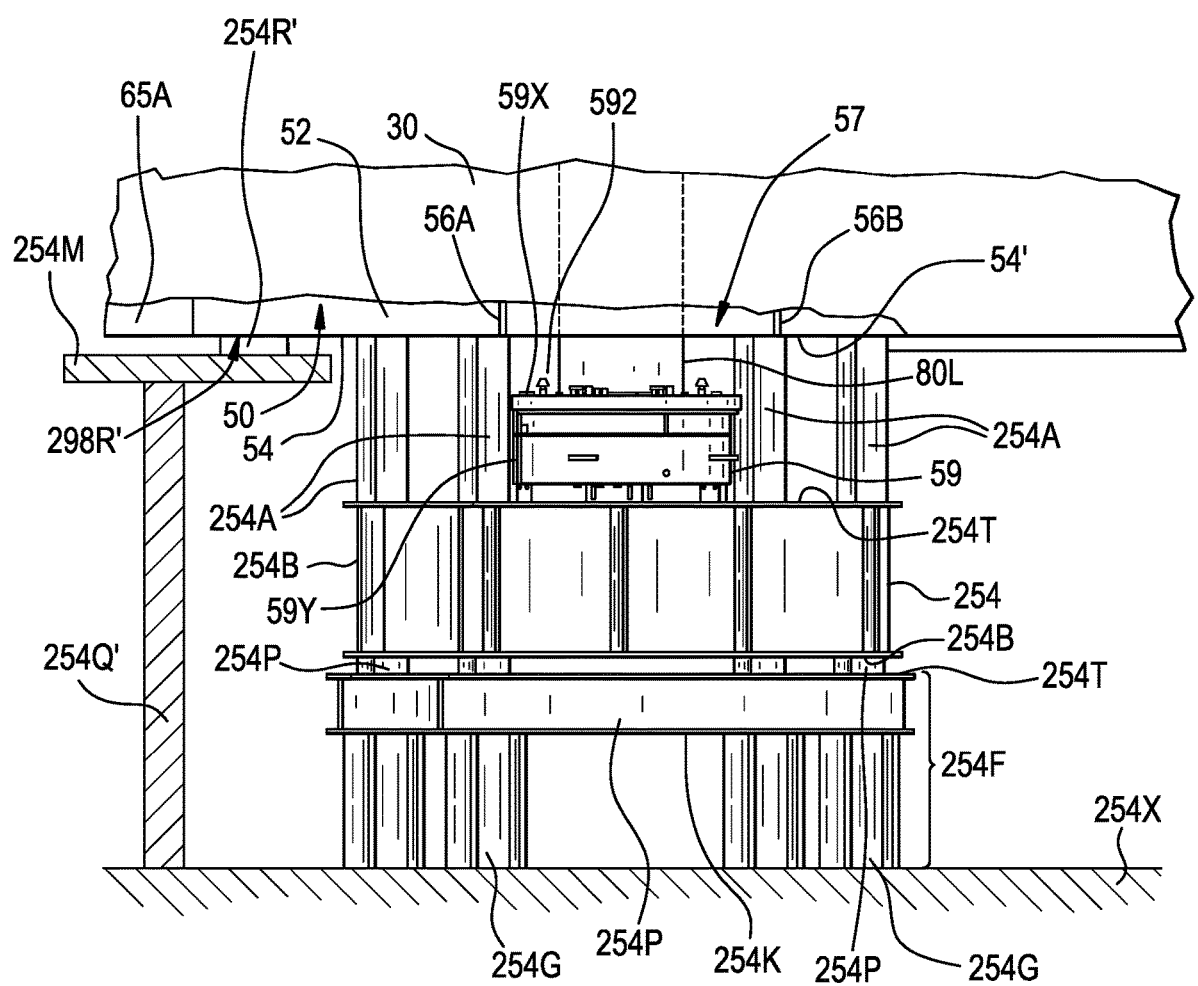

LOW PROFILE SUPPORT STRUCTURE FOR A ROTARY REGENERATIVE HEAT EXCHANGER

CROSS REFERENCE TO RELATED APPLICATIONS

This application is a national stage application of and claims priority to PCT Application No. PCT/US2019/031701, filed May 10, 2019, the subject matter of the aforementioned application is hereby incorporated by reference in its entirety.

FIELD OF THE INVENTION

The present invention relates generally to a low-profile support structure for a rotary regenerative heat exchanger suitable for use in carbon capture applications when the rotor thereof is loaded with a structured adsorbent configured to absorb carbon dioxide from warm air or flue gas and generate purified $CO_2$ and water vapor.

BACKGROUND OF THE INVENTION

Rotary regenerative heat exchangers, typically combustion air preheaters are typically used to transfer heat from a discharge gas stream exiting a vessel (e.g., a furnace or a chemical reactor), to an incoming air stream to improve the efficiency of the process taking place in the vessel. Conventional preheaters include a heat transfer sheet assembly that includes a plurality of heat transfer sheets stacked upon one another in a basket. The heat transfer sheets absorb heat from the discharge gas stream and transfer this heat to the incoming air stream. The preheater further includes a rotor having radial partitions or diaphragms defining compartments which house the baskets. The rotor is rotationally mounted to a support structure via suitable bearings. The preheater includes sector plates that extend across upper and lower faces of the preheater to divide the preheater into one or more sectors. The discharge gas stream and incoming air stream are simultaneously directed through respective sectors. The rotor rotates the discharge gas sector and incoming air sector in and out of the discharge gas stream and the incoming air stream to heat and then to cool the heat transfer sheets thereby heating the incoming air stream and cooling the discharge gas stream.

As shown in FIG. 1, a conventional preheater is generally designated by the numeral 100. The preheater 100 includes a rotor assembly 112 rotatably mounted on a rotor post 116. The rotor assembly 112 is positioned in and rotates relative to a stationary housing 114. For example, the rotor assembly 112 is rotatable with the rotor post 116, about a central axis A of the rotor post 116 in the direction indicated by the arrow R. The rotor assembly 112 includes partitions 118 (e.g., diaphragms) extending radially from the rotor post 116 to an outer periphery of the rotor assembly 112. Adjacent pairs of the partitions 118 define respective compartments 200 for receiving a heat transfer assembly 1000.

As shown in FIG. 1, the housing 114 includes a discharge gas inlet duct 122 and a discharge gas outlet duct 124 for the flow of heated gases through the preheater 100. The housing 114 further includes an incoming air inlet duct 126 and an incoming air outlet duct 128 for the flow of incoming air through the preheater 100. The preheater 100 includes an upper sector plate 130A extending across the housing 114 adjacent to an upper face of the rotor assembly 112. The preheater 100 includes a lower sector plate 130B extending across the housing 114 adjacent to lower face of the rotor assembly 112. The upper sector plate 130A extends between and is joined to the discharge gas inlet duct 122 and the incoming air outlet duct 128. The lower sector plate 130B extends between and is joined to the discharge gas outlet duct 124 and incoming air inlet duct 126. The upper and lower sector plates 130A, 130B, respectively, are combined with a circumferential plate 130C. The upper sector plate 130A and the lower sector plate 130B divide the preheater 100 into an incoming gas sector 134 and a discharge air sector 132. Seals of a known type are provided and are attached to a respective partition 118. The seals scrub across or rotate close to proximately located sector plates 130A and 130B to provide a seal between the incoming air stream 132 and the discharge gas stream 134.

As illustrated in FIG. 1, the arrows marked 'A' indicate the direction of a hot discharge gas stream 136 through the discharge gas sector 134 of the rotor assembly 112. The arrows marked 'B' indicate the direction of an incoming air stream 138 through the incoming gas sector 132 of the rotor assembly 112. The discharge gas stream 136 enters through the discharge gas inlet duct 122 and transfers heat to the heat transfer assembly 1000 mounted in the compartments 200. The heated heat transfer assembly 1000 is rotated into the incoming air sector 132 of the preheater 100. Heat stored in the heat transfer assembly 1000 is then transferred to the incoming air stream 138 entering through the incoming air inlet duct 126. Thus, the heat absorbed from the hot discharge gas stream 136 entering into the preheater 100 is utilized for heating the heat transfer assemblies 1000, which in turn heats the incoming air stream 138 entering the preheater 100.

As shown in FIGS. 2 and 3, the rotor assembly 112 and the housing 114 are quite massive and employ an extensive prior art support structure 150. As shown in FIG. 3, the shaft or rotor post 116 includes a flange 116F mounted to a lower end of the shaft 116 and stub 116E extending from the upper end of the shaft 116. The shaft 116 is axially supported by a pedestal 152 that is secured to a girder 154 or directly to a foundation. The pedestal 152 has a thrust bearing 155 therein for rotatingly supporting the shaft 116. The thrust bearing 155 includes an inner ring 155A with an outer ring 155B extending circumferentially therearound. A plurality of rolling elements 155R are rollingly positioned between the inner ring 155A and the outer ring 155B. The flange 116F engages and is in fixed relationship to the inner ring 155A which rotates with the shaft 116. The outer ring 155B is in fixed relation with a plate 156 that is secured to the girder 154 via suitable fastening systems. The stub 116E of the shaft is guided by and retained radially in a radial bearing 157. The radial bearing 157 includes an inner ring 157A with an outer ring 157B extending circumferentially therearound. A plurality of rolling elements 157R are rollingly positioned between the inner ring 157A and the outer ring 157B. The stub 116E is in fixed relationship with the inner ring 157A and rotates therewith. The outer ring 157B is secured in a shell 158 that is in fixed relation with the support structure 150, as described herein.

As shown in FIG. 3, the prior art support structure 150 includes an upper ring 160U and a lower ring 160L that each circumferentially surround the rotor 112. The upper ring 160U and the lower ring 160L are axially spaced apart from one another and are fixed in axial relation to one another by a first pair of vertical support posts 162A and a second pair of vertical support posts 162B. A first main vertical support assembly 163A and a second main vertical support assembly 163B are positioned opposite one another radially outside of the upper ring 160U and the lower ring 160L. Bottom ends of each of the first main vertical support assembly 163A and the second main vertical support assembly 163B are secured to the foundation. A center horizontal support assembly 164U extends radially across and on top of the upper ring 160U and a center horizontal support assembly 164L extends radially across and below the lower ring 160L. Opposite ends of the center horizontal support assembly 164U are secured to and seat on upper ends of the respective first main vertical support assembly 163A and the second main vertical support assembly 163B which carry the weight and radially retain the center horizontal support assembly 164U. A plurality of pipe braces 165A extend between the columns 162A and the center horizontal support assembly 164U and between the columns 162B and the center horizontal support assembly 164U and radially retain the center horizontal support assembly 164U. A plurality of pipe braces 165B extend between the columns 162A and the pedestal 152 and between the columns 162B and the pedestal 152 and radially retain the center horizontal support assembly 164L. The shell 158 of the radial bearing 157 is rigidly secured to a central portion of the center horizontal support assembly 164U via bearing pad plate 164V and suitable fasteners.

The center horizontal support assemblies 164U, 164L are formed from a massive steel channel that has a plurality of cross struts therein. The center horizontal support assemblies 164U, 164L have a width that covers a substantial portion of the rotor 112. The center horizontal support assemblies 164U, 164L block flow of gases through the rotor 112 and thereby decreases the effectiveness of the preheater. In addition, the center horizontal support assembly 164 is so wide that it impedes the ability of the compartments 200 from being populated with heat transfer assemblies 1000 thereby complicating assembly. In addition, the first pair of vertical support posts 162A, the second pair of vertical support posts 162B, the first main vertical support assembly 163A, and the second main vertical support assembly 163B (collectively referred to as prior art external support structures) are positioned radially outward of a peripheral circumferential boundary 100P of the conventional preheater 100 as indicated by the arrow R200 in FIG. 3, which creates an excessive space envelope problem for installation of the conventional preheater 100 in a facility such as a power plant.

Rotary regenerative heat exchangers can also be employed in $CO_2$ capture systems such as thermal swing adsorption (TSA) systems used in fossil power plant systems. Rotary regenerative heat exchangers in TSA systems are based on the general mechanical principles of the conventional preheater 100 illustrated in FIGS. 1-3 but have different duct arrangements and use rotors having adsorption media rather than the heat transfer assemblies 1000 employed in the conventional preheaters 100. The TSA systems include an adsorption step in which flue gas enters adsorption beds located in the rotor of the rotary regenerative heat exchanger as a feed stream. After the adsorption beds become occupied by $CO_2$, the beds are rotated into a regeneration area of the rotary regenerative heat exchanger where low pressure steam is used to release $CO_2$ from the adsorbent and produce a product stream of water vapor and $CO_2$. The last step, before the cyclic process is repeated, includes introducing ambient air to cool the adsorbent to an optimal temperature for $CO_2$ adsorption in the adsorption step. In implementing such TSA systems access to the rotary regenerative heat exchanger via many ducts is required and includes flue gas inlet ducts, flue gas outlet ducts, $CO_2$ product stream outlet ducts, steam inlet ducts, cooling air inlet ducts and cooling air outlet ducts. Thus, there is limited space available for other structures such as the first main vertical support assembly 163A, the second main vertical support assembly 163B and the center horizontal support assemblies 164U, 164L. Because of the extensive duct work, space is also limited for adding and removing adsorbent to the rotor in the rotary regenerative heat exchanger.

Thus, there is a need to address at least the foregoing problems.

SUMMARY OF THE INVENTION

There is disclosed herein a support structure for a rotary regenerative heat exchanger which includes an upper section, a lower section, and a plurality of support members. The upper section includes an upper ring having a first exterior surface, an upper hub and at least three upper spokes each extending between, and secured at respective ends thereof, to the upper ring and the upper hub. The lower section is configured to be supportable in use by a foundation mounting structure, mounted on a foundation, with the lower section being spaced apart from the upper section. Each of the plurality of support members is fixedly secured, directly or indirectly, to the upper ring and the lower section creating an annular space between the upper ring and the lower section. The annular space is configured to receive compartments of a rotor assembly. The upper hub, the upper spokes and the support members cooperate to provide rigidity to the support structure such that the support members cooperate to support and transmit the weight of the upper spokes, the upper ring and the upper hub to the lower section.

In one embodiment, the lower section includes a lower ring having a second exterior surface, a lower hub and at least three lower spokes each extending between and secured at respective ends to the lower ring and the lower hub.

In one embodiment, a plurality of outboard support pads intermediate the foundation supporting structure and the lower section are provided adjacent respective lower ends of one or other of the upright support members and/or a plurality of inboard support pads, disposed beneath axially inner end portions of one or more of the lower spokes and/or beneath the lower hub.

In one embodiment, at least one of the plurality of support members includes a strut, a rod, a beam or a channel.

In one embodiment, the upper ring has at least one upper radial opening extending therethrough and an upper extension portion of the at least one of the upper spokes extending through a respective one of the upper radial opening.

In one embodiment, the lower ring has at least one lower radial opening extending therethrough and a lower extension portion of the at least one of the lower spokes extending through a respective one of the lower radial opening.

In one embodiment, the at least one support member is secured to at least one of the upper extension portion and the lower extension portion.

In one embodiment, a pair of the support members is secured to the upper ring at a junction of each spoke with the upper ring and to the lower ring at a junction of each spoke with the lower ring.

In one embodiment, at least one of the upper ring and the lower ring has at least one of a box cross section, a radially inward opening C-shaped cross section and a radially outward opening C-shaped cross section.

In one embodiment, at least one of the upper spokes and the lower spokes has at least one of a box shaped cross section and a tapered top profile expanding radially outward.

In one embodiment, the upper hub includes an upper hub body having an upper gusset pattern attached therein to an inside surface of a circumferentially peripheral wall thereof. There is a first central opening extending through the upper gusset pattern.

In one embodiment, the upper hub includes an upper hub body having an upper support pad extending over and attached solely at or adjacent an axial periphery of the upper hub body or a circumferentially peripheral wall of the upper hub body of the upper hub, and a second central opening extending through the upper support pad. The upper support pad has flexure promoting features configured to cause the upper support pad to flex in response to loads applied thereto.

In one embodiment, at least one of the axially inner ends of the upper spokes is rigidly attached to at least one of: the axial periphery of the upper hub body and part of the upper gusset pattern. In one embodiment, the lower hub includes a lower hub body having a lower gusset pattern attached therein with a third central opening extending through the lower gusset pattern and axially inner ends of the lower spokes are rigidly attached to at least one of: the axial periphery of the lower hub body and the or part of the lower gusset pattern.

In one embodiment, the lower hub includes a lower hub body having a lower support pad extending over and attached to the lower hub body, and a fourth central opening extending through the lower support pad.

In one embodiment, each upper spoke of the upper ring is adapted to have mounted thereon a sealing assembly which in use operatively and intermittently seals a rotor assembly thereto.

In one embodiment, each spoke of the lower ring is adapted to have mounted thereon a sealing assembly which in use operatively and intermittently seals a rotor assembly thereto.

In one embodiment, a rotatory regenerative heat exchanger according to the present disclosure includes a support structure and a rotor assembly rotationally mounted in the support structure. The support structure comprises at least one of: foundation support receiving areas configured to receive the foundation mounting structure, substantially all of the foundation support receiving areas being located substantially radially inward of a peripheral circumferential boundary of the support structure; a first rotor assembly support area located substantially axially below an upper axial boundary of the upper section of the support structure; and a second rotor assembly support area located substantially axially below an upper axial boundary of the upper section of the support structure.

BRIEF DESCRIPTION OF THE DRAWINGS

FIG. 6A is a cross sectional view of the rotary regenerative heat exchanger support structure and rotor taken across section 6-6 of FIG. 5A;

FIG. 10 is a front view of the thrust bearing pedestal of the rotary regenerative heat exchanger support structure of detail 10 of FIG. 5;

DETAILED DESCRIPTION

Figure 4A:
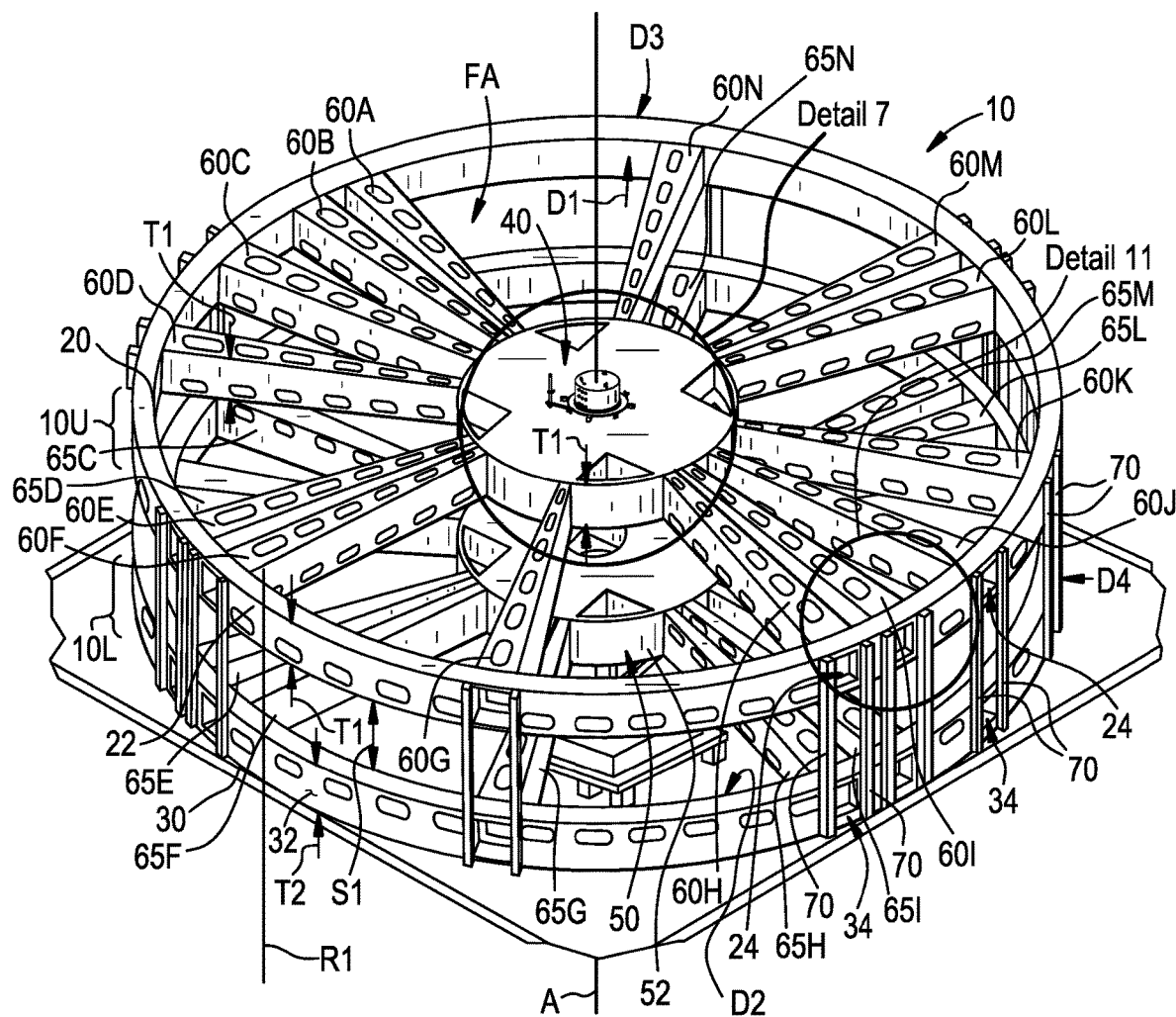
FIG. 4A is a perspective view of the rotary regenerative heat exchanger support structure of the present invention.

As shown in FIG. 4A, a support structure for a rotary regenerative heat exchanger 1 (see FIG. 5A) is generally designated by the numeral 10. The support structure 10 is an exoskeleton for housing a rotor assembly 90 (see FIG. 5A) of the rotary regenerative heat exchanger 1 and for providing structure support and mounting to a foundation and ducting (ducting shown in FIG. 12). The support structure 10 is constructed of an upper section 10U and a lower section 10L axially spaced apart from one another along and concentric with a central axis A thereby defining an annular space S1 between the upper section 10U and a lower section 10L. The annular space S1 is configured to receive compartments 92 of a rotor assembly 90, as described herein, with reference to FIG. 5A.

Figure 12:
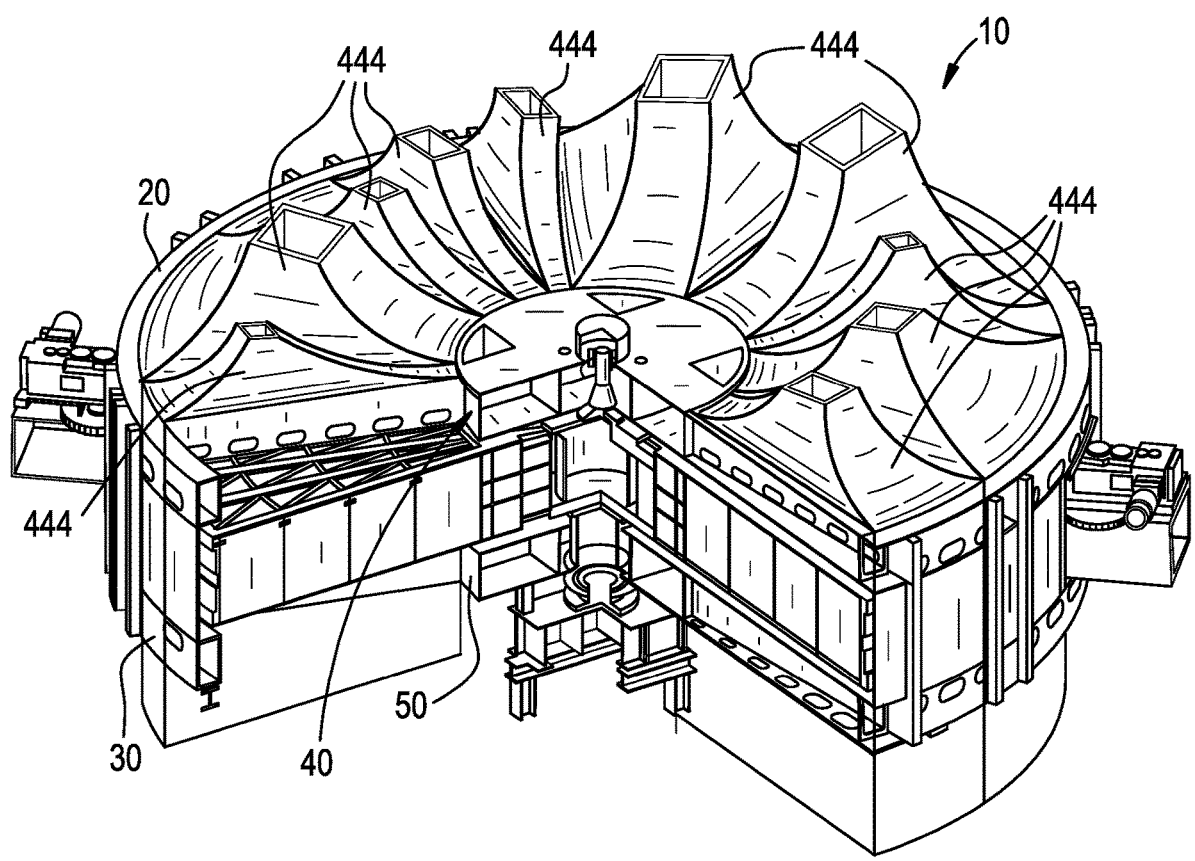
FIG. 12 is a perspective view of the regenerative heat exchanger of FIG. 5A shown with ducts attached thereto.

As shown in FIG. 4A, the central axis A represents a vertical direction, thus the terms upper and lower are employed in a relative manner to distinguish components of the upper section 10U from the lower section 10L. Thus, the upper section 10U and the lower section 10L are shown oriented in a horizontal plane. However, the present invention is not limited in this regard, as the support structure 10 may be employed in any orientation including but not limited to an angular tilted configuration, a horizontal central axis and a vertical configuration. The support structure 10 has utility for use in supporting regenerative heat exchangers for use in $CO_2$ capture systems that employ adsorbent media, such as TSA systems that include an adsorption step in which flue gas enters adsorption beds located in the rotor 90 of the rotary regenerative heat exchanger as a feed stream. After the adsorption beds become occupied by $CO_2$, the beds are rotated into a regeneration area of the rotary regenerative heat exchanger where low pressure steam is used to release $CO_2$ from the adsorbent and produce a product stream of water vapor and $CO_2$. The last step, before the cyclic process is repeated, includes introducing ambient air to cool the adsorbent to an optimal temperature for $CO_2$ adsorption in the adsorption step. As shown in FIG. 12, the support structure 10 of the present invention provides access to the rotary regenerative heat exchanger required in TSA systems and is configured to receive the many ducts 444 including flue gas inlet ducts, flue gas outlet ducts, $CO_2$ product stream outlet ducts, steam inlet ducts, cooling air inlet ducts and cooling air outlet ducts. The ducts 444 are stationary and are sealed (e.g., with a gasket) to two adjacent spokes (i.e., two of 60A-60N). While FIG. 12 illustrates the ducts 444 configured onto the upper ring 20 corresponding ducts are configured to the lower ring 30 and are sealed (e.g., with a gasket) in a stationary manner to two adjacent spokes (two of 65A-65N). While the support structure 10 is shown and described for use in supporting a regenerative heat exchangers for use in $CO_2$ capture systems that employ adsorbent media, the present invention is not limited in this regard as the support structure 10 may also be employed in other applications such as but not limited to use in air preheaters for fossil fuel power plants.

Figure 4B:
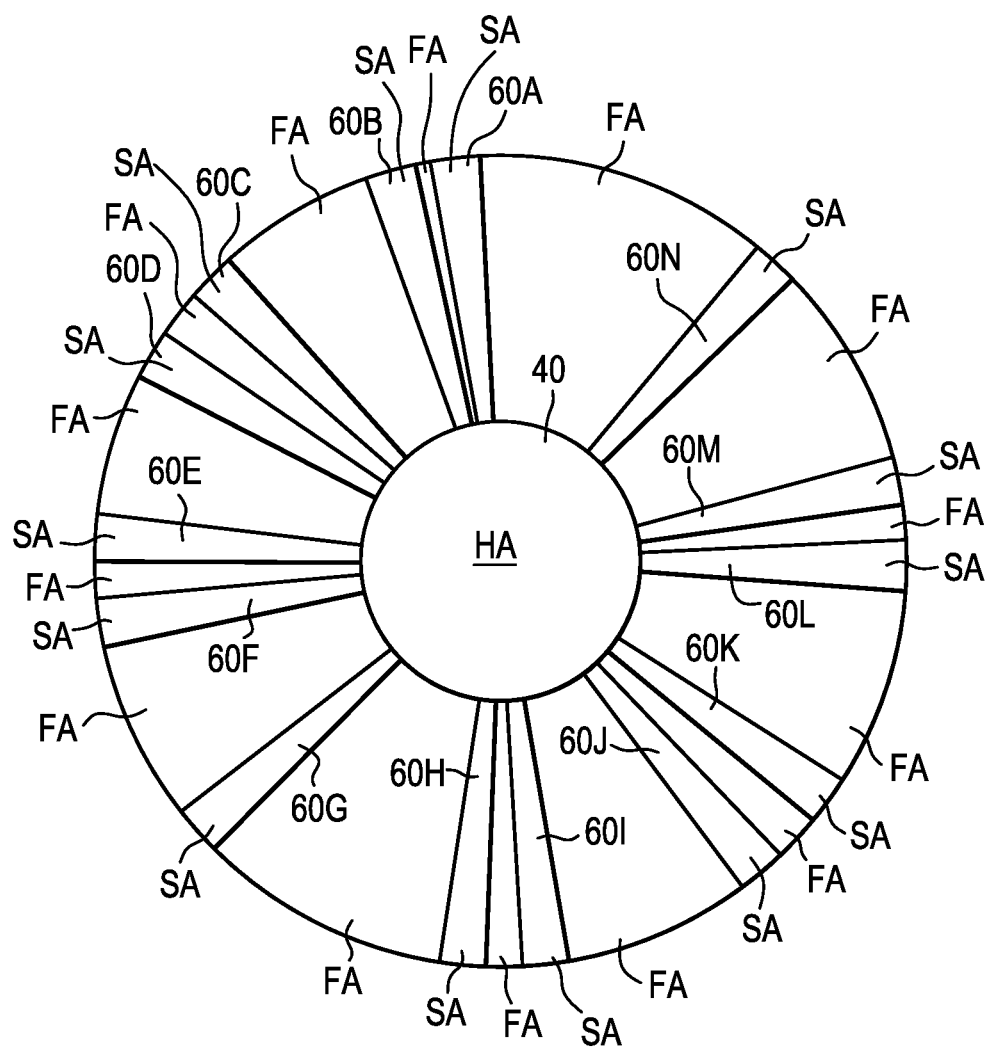
FIG. 4B is a top axial view of the rotary regenerative heat exchanger support structure of the present invention.

As shown in FIG. 4A, the upper section 10U is constructed from an upper ring 20 which has a first exterior surface 22. In one embodiment, the first exterior surface 22 is upright (i.e., vertical). In one embodiment, an axially oriented reference line R1 to the first exterior surface 22 is parallel to the central axis A. The upper section 10U also includes an upper hub 40 and a plurality (e.g., fourteen) of upper spokes 60A, 60B, 60C, 60D, 60E, 60F, 60G, 60H, 60I, 60J, 60K, 60L, 60M and 60N each extending between and secured to the upper ring (20) and the upper hub (40). The upper hub 40 and the plurality (e.g., fourteen) of the upper spokes 60A, 60B, 60C, 60D, 60E, 60F, 60G, 60H, 60I, 60J, 60K, 60L, 60M and 60N support position and weight of the upper ring (20). While fourteen upper spokes are shown and described, the present invention is not limited in this regard as at least three upper spokes may be employed. The upper spokes 60A-60N extend a length between an inner end and an outer end thereof. The inner end of each upper spoke 60A-60N is secured to the upper hub 40 by suitable means such as welding and the use of mechanical fasteners such as bolting, flanges and sleeves. The outer end of each upper spoke 60A-60N is secured to the upper ring 20, suitable means such as welding and the use of mechanical fasteners such as bolting, flanges and sleeves. Referring now to FIG. 4B, the upper spokes 60A-60N define areas of free flow (FA) therebetween. Because there is no center horizontal support assembly 164 to obstruct flow, the total area within support structure 10 can thus be defined by the following formula I:

$$\text{Total Area} = \sum FA + XA \qquad \text{(Formula I)}$$

Wherein FA is the free flow area unobstructed by the upper spokes 60A-60N and the upper hub 40, and XA is the obstructed area defined by formula II:

$$XA = \sum SA + HA \qquad \text{(Formula II)}$$

wherein SA is the area occupied by the upper spokes 60A-60N, and HA is the hub area. Therefore, the total free flow area is thus defined by formula III:

$$\sum FA = \text{Total Area} - \sum SA - HA \qquad \text{(Formula III)}$$

The ratio of the unobstructed area $\Sigma FA$ to the obstructed area $\Sigma SA$, namely $$\frac{\Sigma FA}{\Sigma SA},$$

is between about 5 to 1 and about 25 to 1.

Referring again to FIG. 4A, in one embodiment, the upper ring 20, the upper hub 40 and the upper spokes 60A-60N are intersected by a common plane that is parallel to axial faces of the upper ring 20, the upper hub 40 and the upper spokes 60A-60N. In one embodiment, the upper ring 20, the upper hub 40 and the upper spokes 60A-60N have substantially equal axial thicknesses T1. In one embodiment, upper ring 20, the upper hub 40 and the upper spokes 60A-60N have different axial thicknesses T1. In one embodiment, the upper ring 20, the upper hub 40 and the upper spokes 60A-60N are coplanar.

Still referring to FIG. 4A, the lower section 10L is constructed from a lower ring 30 that has a second exterior surface 32, a lower hub 50 and a plurality (e.g., fourteen) of lower spokes (only ten shown 65C, 65D, 65E, 65F, 65G, 65H, 65I, 65L, 65M and 65N) each extending between and secured to the lower ring 30 and the lower hub 50 and axially and radially aligned with the upper spokes 60A-60N. The lower hub 50 and the plurality (e.g., fourteen) of lower spokes (only ten shown 65C, 65D, 65E, 65F, 65G, 65H, 65I, 65L, 65M and 65N) support position and weight of the lower ring 30. While fourteen lower spokes are described, the present invention is not limited in this regard as at least three lower spokes may be employed or another support structure such as a gusset configuration may be employed. The lower spokes 65A-65N extend a length between an inner end and an outer end thereof. The inner end of each lower spoke 65A-65N is secured to the lower hub 50 by suitable means such as welding and the use of mechanical fasteners such as bolting, flanges and sleeves. The outer end of each lower spoke 65A-65N is secured to the lower ring 30, suitable means such as welding and the use of mechanical fasteners such as bolting, flanges and sleeves. While the lower hub 50 and the plurality (e.g., fourteen) of lower spokes (only ten shown 65C, 65D, 65E, 65F, 65G, 65H, 65I, 65L, 65M and 65N) are described as supporting the lower ring 30, the present invention is not limited in this regard as the lower ring 30 may be support by other support configurations, including but not limited to pillars or unitary structures that support the lower ring 30 to the foundation. In one embodiment, the lower ring 30, the lower hub 50 and the lower spokes 65A-65N are intersected by a common plane that is parallel to axial faces of the lower ring 30, the lower hub 50 and the lower spokes 65A-65N. In one embodiment, the lower ring 30, the lower hub 50 and the lower spokes 65A-65N have substantially equal axial thicknesses T2. In one embodiment, lower ring 30, the lower hub 50 and the lower spokes 65A-65N have different axial thicknesses T2. In one embodiment, lower ring 30, the lower hub 50 and the lower spokes 65A-65N are coplanar. The upper ring axial thickness T1 and the lower ring axial thickness T2 are substantially equivalent.

The lower section 10L is spaced S1 apart from the upper section 10U. A plurality of support members 70 are fixedly secured to space apart the upper ring 20 from the lower ring 30. In one embodiment, the support members 70 are directly fixedly secured to the upper ring 20 and the lower ring 30 as described herein with reference to FIG. 4A. In one embodiment, support members 70 are indirectly fixedly secured to the upper ring 20 and the lower ring 30 as described herein with reference to FIG. 11. In one embodiment, the support members 70 are parallel to the central axis A. In one embodiment, the support members 70 are oriented in an upright (i.e., vertical) position, however the present invention is not limited in this regard as the support members 70 may be oriented at an angle relative to the central axis A, at an angle and parallel to the central axis or in a horizontal position when the central axis A is horizontal. In one embodiment, the upper ring 20 and the lower ring 30 are coaxially aligned along the central axis A. In one embodiment, the upper ring 20 to the lower ring 30 have substantially equal inside diameters D1 and D2 as shown on FIG. 4A. In one embodiment, the upper ring 20 to the lower ring 30 have substantially equal outside diameters D3 and D4, as shown on FIG. 4A. Each of the plurality of support members 70 is a strut. While each of the support members 70 is described as being a strut, the present invention is not limited in this regard as each of the support members may be a rod, a beam or a channel, combinations thereof or some support members may be struts and other support members may be rods, beams or channels.

Referring now to FIG. 6A, together with the thickness T1 of the upper ring 20 and the thickness T2 of the lower ring 30, the overall axial thickness of the support structure 10 at the outside diameters D3 and D4 is defined as T3. The ratio of thickness T3 to space S1 is between 1 to about 2 and 3 to about 2. The ratio of the space S1 to the ring thickness, e.g., the upper ring axial thickness T1 or the lower ring axial thickness T2, is between about 1 to 1 and about 3 to 1. The ratio the outside diameters D3 and D4 to the axial thickness T3 is between about 3 to 1 and about 7 to 1.

Referring again to FIG. 4A, each of the plurality of support members 70 extend over and are secured (e.g., directly secured via welding, brazing or via the use of mechanical fasteners) to the first exterior surface 22 of the upper ring 20 and the second exterior surface 32 of the lower ring 30. While the support members 70 are shown and described as being secured to the first exterior surface 22 and the second exterior surface 32, the present invention is not limited in this regard as one or more of the support members 70 may be secured to an inside surface of the upper ring 20 and/or an inner surface of the lower ring 30; the one or more of the support members 70 may be secured between the first exterior surface 22 and the inside surface of the upper ring 20; and/or the one or more of the support members 70 may be secured between the second exterior surface 32 and the inside surface of the lower ring 30.

Figure 11:
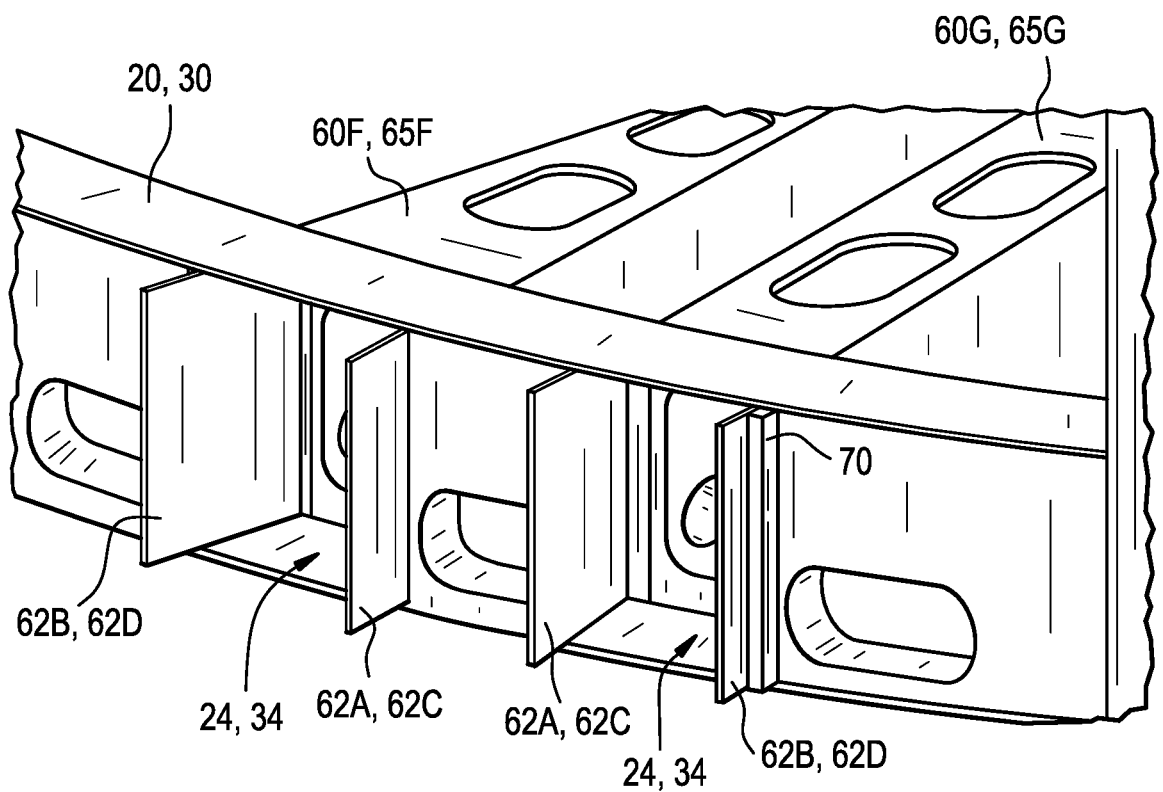
FIG. 11 is an enlarged perspective view of a portion of the upper ring of detail 11 of FIG. 4A.

In some embodiments, the plurality of support members 70 are indirectly secured to the upper ring 20 and the lower ring 30. As best shown in FIG. 11, for example, the upper ring 20 includes an upper radial opening 24 extending therethrough at a juncture of a respective one of the upper spokes 60A-60N and the upper ring 20. Each of the upper spokes 60A-60N has two upper extension portions (e.g., tabs) 62A, 62B extending therefrom. Each of the upper extension portions 62A, 62B extends through a respective one of the upper radial openings 24. The lower ring 30 includes a lower radial opening 34 extending therethrough at a juncture of a respective one of the lower spokes 65A-65N and the lower ring 30. Each of the lower spokes 65A-65N has two lower extension portions (e.g., tabs) 62C, 62D extending therefrom. Each of the lower extension portions 62C, 62D extends through a respective one of the lower radial openings 34. For example, FIG. 11 illustrates one of the support members 70 directly secured (e.g., via welding or via mechanical fasteners) to the upper/lower extension member 62B/62D, thereby indirectly securing the support members 70 to the upper ring 20 and the lower ring 30.

Whilst it is desirable to attach the support members 70 by welding, for example to the various extension portions 62A, 62B to the respective upper and lower rings 20, 30 through which the extension portions 62A and 62B extend, it will be appreciated that in an embodiment not shown, these extension portions 62A, 62B could function to hold or capture, in a predetermined fixed spatial position, the upper ring 20 and lower ring 30 through which the extension portions 62A and 62B pass to define the circular geometry of the upper and lower rings 20, 30.

Figure 5A:
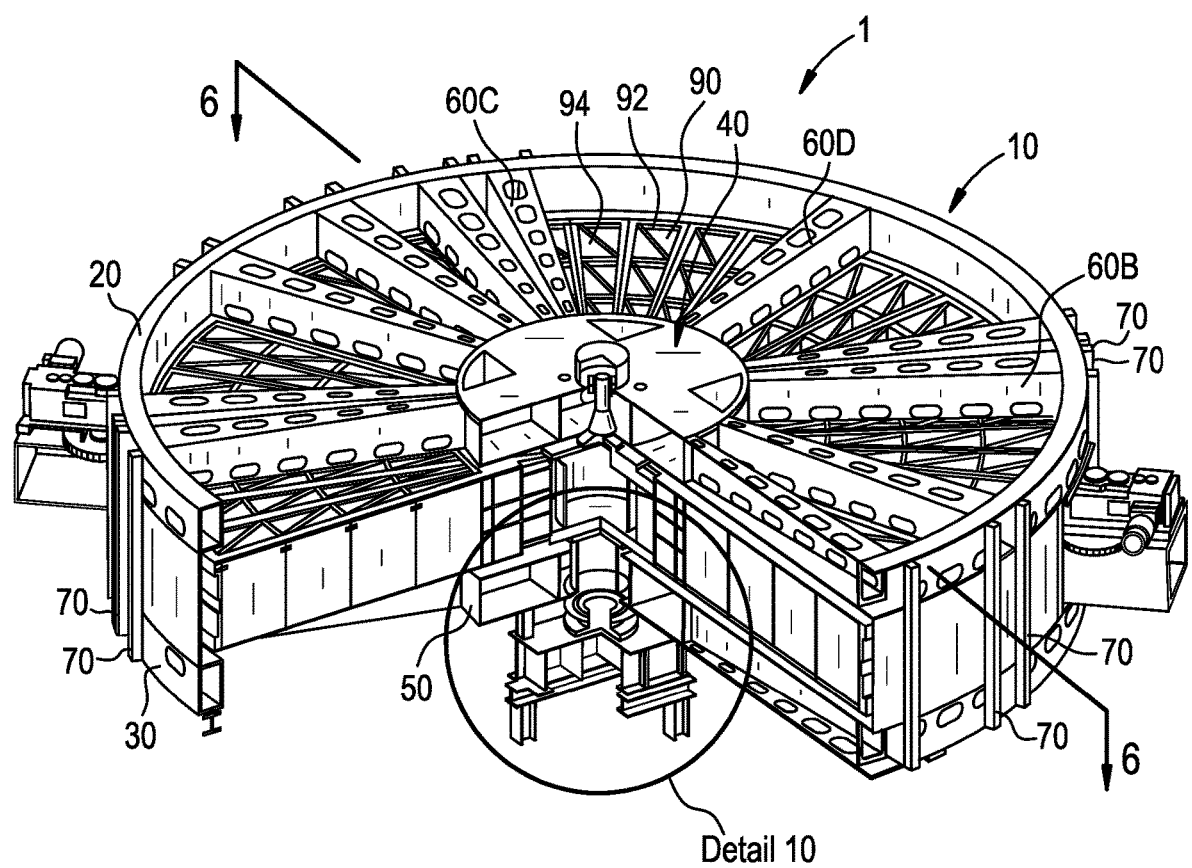
FIG. 5A is a perspective view of the rotary regenerative heat exchanger support structure of FIG. 4A, shown in a cut away view with a rotor installed therein.
Figure 5B:
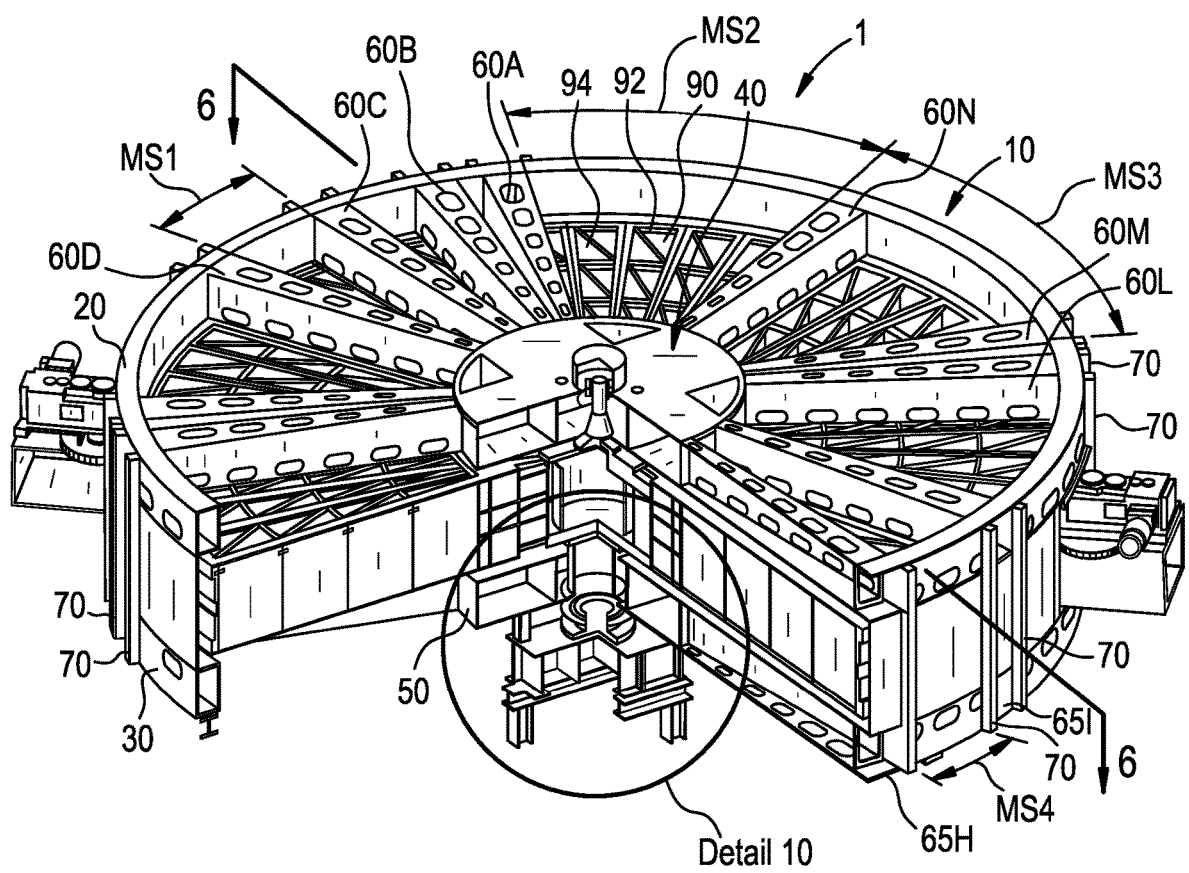
FIG. 5B is a perspective view of the rotary regenerative heat exchanger support structure of FIG. 4A, shown in a cut away view with a rotor installed therein and with portions of the upper ring and lower ring constructed of modular segments.

As shown in FIG. 5B, the upper ring 20 is pre-fabricated in modular radial segments (e.g., MS1, MS2 and MS3) that are presented to the appropriate spoke extension portions 62A, 62B shown in FIG. 11. The radial segment MS1 extends between the upper spoke 60D and the upper spoke 60C. The radial segment MS2 extends between the upper spoke 60A and the upper spoke 60N. The radial segment MS3 includes the upper spoke 60N and the upper spoke 60M. The upper ring 20 may be fabricated in any combination of radial segments that include no spokes 60A-N or one or more spokes 60A-N. The lower ring 30 may be prefabricated similar to the upper ring 20 with any number of radial segments, such as the radial segment MS4 which extends between lower spoke 65H and lower spoke 65I.

As shown in FIG. 5B, the radial segments MS1, MS2, MS3 for the upper ring 20 are welded or otherwise attached to respective adjacent radial segments to fabricate a complete ring (i.e., the upper ring 20) having an inner circumference defined by related length of the respective upper spokes 60A-N and/or lower spokes 65A-N and an elevation (i.e., axial spacing of the upper ring 20 and the lower ring 30) defined by the length of each of the plurality of support members 70 as described herein with reference to FIG. 4A. The radial segments for the lower ring 30 are welded or otherwise attached one to the other to fabricate a complete ring (i.e., the lower ring 30) having an inner circumference defined by related length of the respective upper spokes 60A-N and/or lower spokes 65A-N and an elevation (i.e., axial spacing of the upper ring 20 and the lower ring 30) defined by the length of each of the plurality of support members 70 as described herein with reference to FIG. 4A.

While the upper ring 20 is shown and described as having the upper extension portions 62A, 62B extending through the upper radial openings 24, the present invention is not limited in this regard as other configurations for securing the upper spokes 60A-60N to the upper ring 20 may be employed including the upper extensions portions 62A, 62B of the respective upper spoke 60A-60N extending partially into a respective one of the upper radial openings 24; the upper extensions portions 62A, 62B of the respective upper spoke 60A-60N secured to the inner surface of the upper ring 20; no upper extensions portions 62A, 62B but with the respective upper spoke 60A-60N extending into the respective upper radial opening 24; and no upper extensions portions 62A, 62B but with the respective upper spoke 60A-60N secured directly to the upper ring 20 in a predetermined location such as a lip or abutment surface on or attached to the upper ring 20.

While the lower ring 30 is shown and described as having the lower extension portions 62C, 62D extending through the lower radial openings 34, the present invention is not limited in this regard as other configurations for securing the lower spokes 65A-65N to the lower ring 30 may be employed including the lower extensions portions 62C, 62D of the respective lower spoke 65A-65N extending partially into a respective one of the lower radial openings 34; the lower extensions portions 62CA, 62D of the respective lower spoke 65A-65N secured to the inner surface of the lower ring 30; no lower extensions portions 62C, 62D but with the respective lower spoke 65A-65N extending into the respective lower radial opening 34; and no lower extensions portions 62C, 62D but with the respective lower spoke 65A-65N secured directly to the lower ring 30 in a predetermined location such as a lip or abutment surface on or attached to the lower ring 30.

As shown in FIG. 4A, a plurality of support members 70 are secured to the upper extension portion 62A, 62B and the lower extension portion 62C, 62D. In one embodiment, a pair of the support members 70 are secured to the upper ring 20 at a junction of each spoke 60A-60N with the upper ring 20; and to the lower ring 30 at a junction of each spoke 65A-65N with the lower ring 30. In one embodiment, one support member 70 is secured to the upper extension member 62A and the lower extension member 62C and another support member 70 is secured to the upper extension member 62B and the lower extension member 62D. In one embodiment, the support members 70 are welded to the respective upper extension member 62A, 62B and the lower extension members 62C, 62D. The support members 70 extend between and space apart the upper ring 20 and the lower ring 30. Thus, the support members 70 sustain and carry the weight of the upper ring 20 and transmit the load of the weight of the upper ring 20 onto the lower ring 30. The support members 70 cooperate to support and transmit the weight of the upper spokes 60A-N, the upper ring 20 and the upper hub 40 to the lower section 10L. In one embodiment, the support members 70 are aligned substantially parallel to one another and the central axis A. In one embodiment, the support members 70 are configured in a vertical orientation.

Figure 9A:
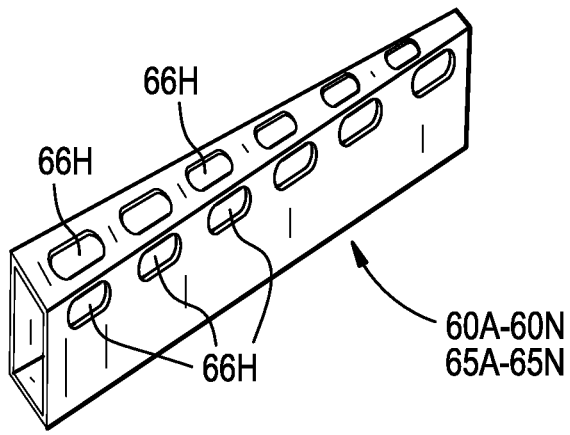
FIG. 9A is a perspective view of one of the spokes of the rotary regenerative heat exchanger support structure of FIGS. 4A-B.
Figure 9B:
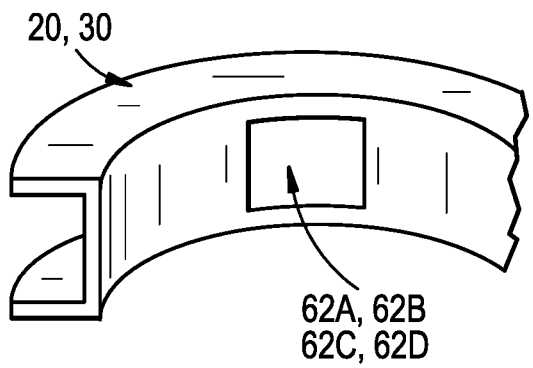
FIG. 9B is a perspective view of one of the peripheral support ring of the rotary regenerative heat exchanger support structure of FIGS. 4A-B.
Figure 9C:
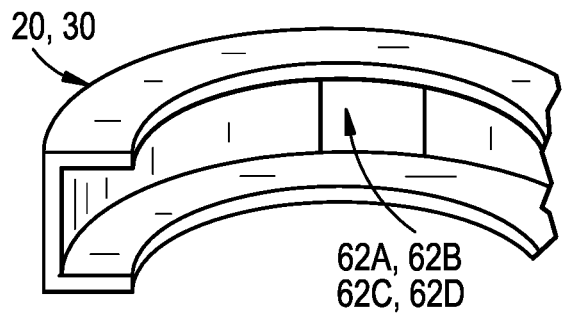
FIG. 9C is a perspective view of one of the peripheral support ring of the rotary regenerative heat exchanger support structure of FIGS. 4A-B.
Figure 9D:
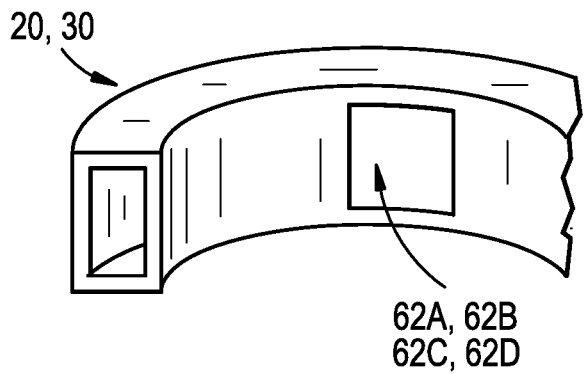
FIG. 9D is a perspective view of one of the peripheral support ring of the rotary regenerative heat exchanger support structure of FIGS. 4A-B.

As shown in FIGS. 9B, 9C and 9D, the upper ring 20 and/or the lower ring 30 has a box cross section (FIG. 9D), a radially inward opening C-shaped (FIG. 9C) cross section and a radially outward opening C-shaped cross section (FIG. 9B).

As shown in FIG. 9A, one or more of the upper spokes 60A-60N and the lower spokes 65A-65N have a box shaped cross section and a tapered top profile expanding radially outward.

Figure 6B:
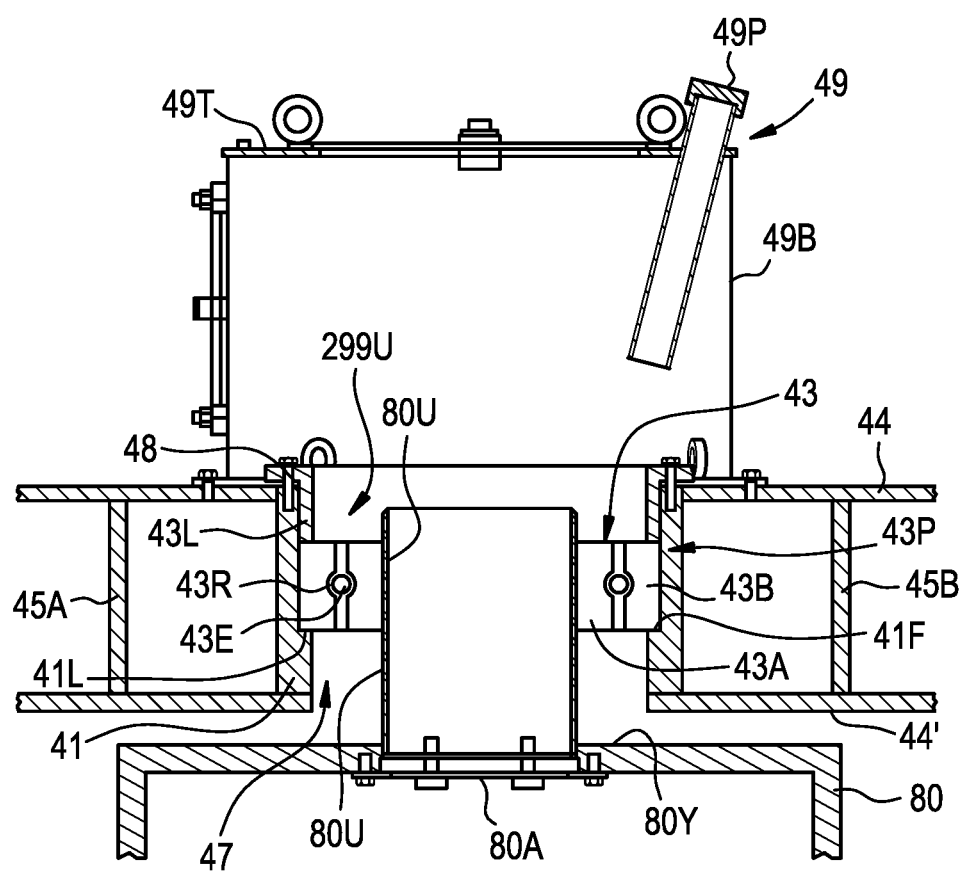
FIG. 6B is a cross sectional view of the upper bearing structure as shown in FIG. 6A.
Figure 7:
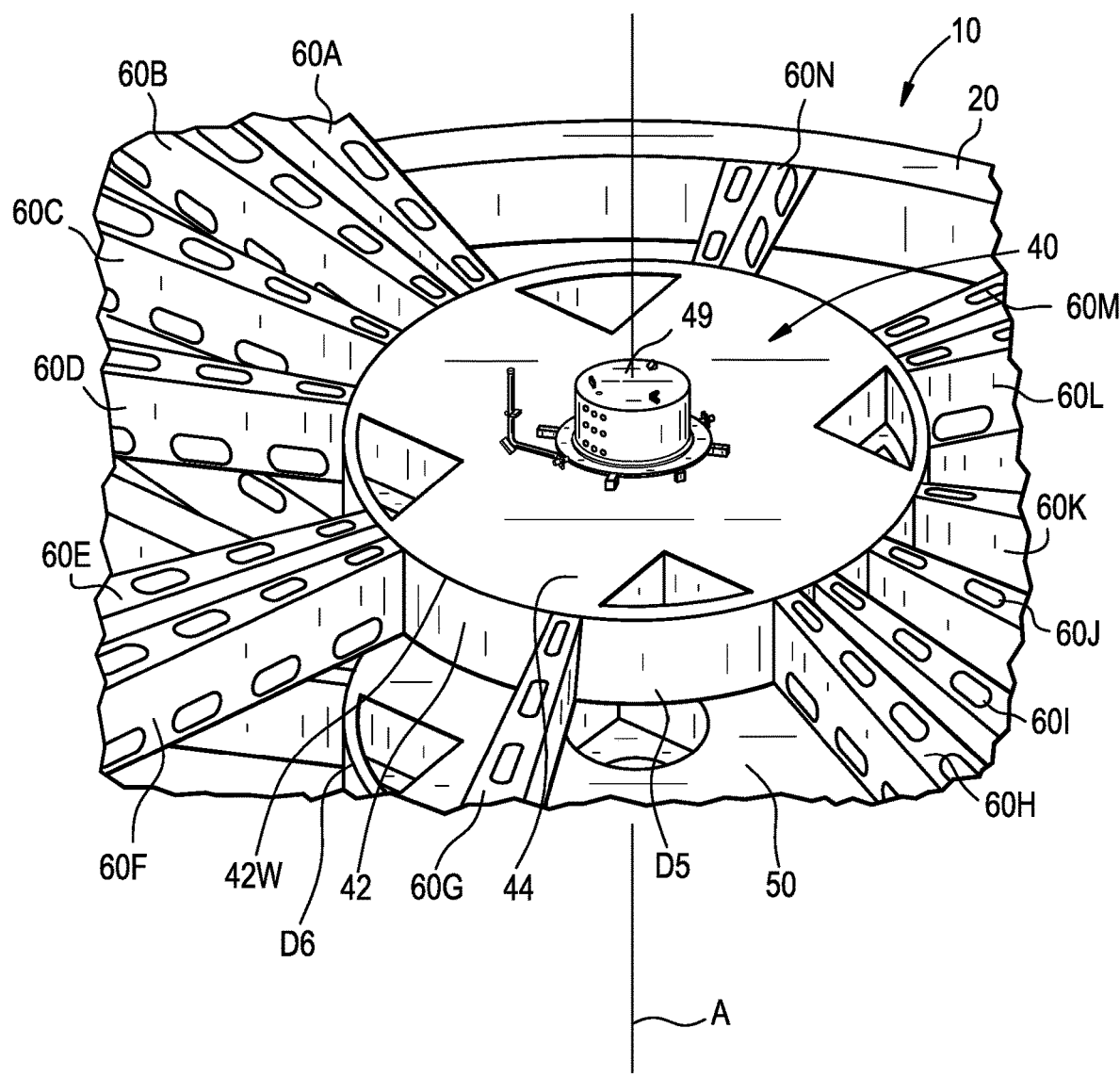
FIG. 7 is an enlarged perspective view of the upper hub portion of the rotary regenerative heat exchanger support structure of detail 7 of FIG. 4A.
Figure 8A:
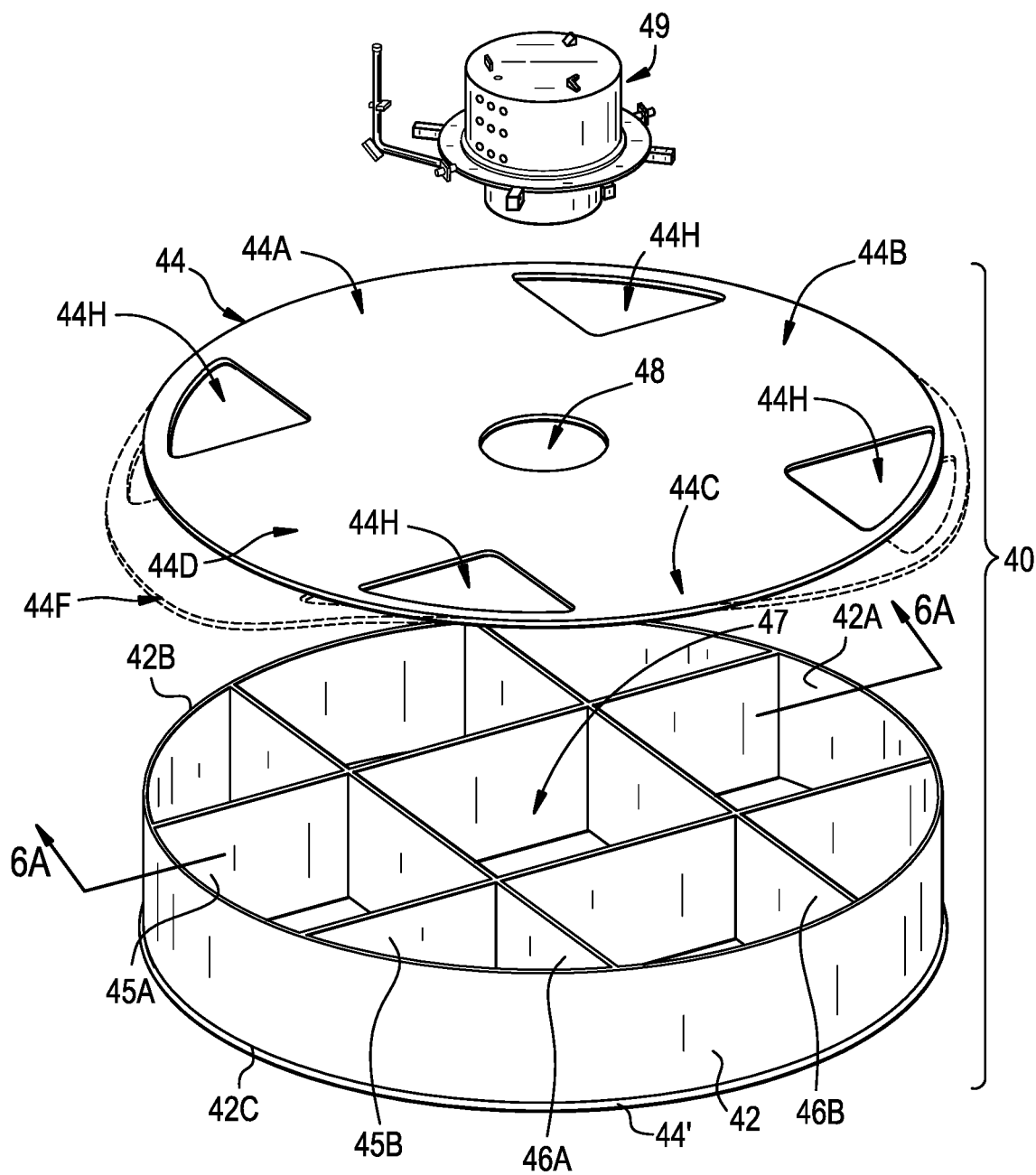
FIG. 8A is an enlarged exploded view of the upper hub portion of the rotary regenerative heat exchanger support structure of FIG. 7.

As shown in FIGS. 7 and 8A, the upper hub 40 includes an upper hub body 42 (e.g., a hollow cylindrical shell) having an upper gusset pattern 45A, 45B, 46A, 46B attached therein and with a first central opening 47 extending through the upper gusset pattern. In one embodiment, the upper gusset pattern 45A, 45B, 46A, 46B includes a crisscross arrangement of plates attached (e.g., welded) to one another and to an inside surface 42A of the upper hub body 42. The upper hub 40 includes an upper support pad 44 extending over and attached to (e.g., welded to an upper axial end 42B) the upper hub body 42. The upper support pad 44 has a second central opening 48 extending therethrough. In one embodiment, the upper support pad 44 is not secured to the upper gusset pattern 45A, 45B, 46A, 46B and thus allows the upper support plate 44 to flex relative to the upper hub body 42 upon application of a load (e.g., torsional, axial, radial and misalignment loads transmitted via the upper bearing 43) thereto. In such an embodiment as illustrated in FIG. 8A and to facilitate such flexure as shown by the dashed lines 44F, the upper support pad 44 is provided with flexure promoting features in the form of exemplary cut out holes 44H (e.g., four holes shown) which form four spokes 44A, 44B, 44C and 44D that are generally coextensive with adjacent parallel portions of members of the upper gusset pattern 45A, 45B, 46A, 46B to be vertically supported thereby. A second support pad 44' may be secured to a lower axial end 42C of the upper hub body 42, as shown in FIGS. 6A and 8A. When present, the second support pad 44' provides a structural web that can be rigidly attached both to the lower axial end 42C and lower ends of the individual members of the upper gusset pattern 45A, 45B, 46A, 46B. The ratio of the upper hub 40 outside diameter D5 (D5 shown on FIG. 7) to the upper ring 20 inside diameter D1 (D1 shown on FIG. 4A) is between 1 to about 5.5 and 1 to about 6.5. While, the upper support pad 44 is shown and described as having the holes 44H and the spokes 44A-D, the present invention is not limited in this regard as the upper support pad 44 may have more holes and spokes or may be solid. The second support pad 44' may be configured similar to the first support pad 44 and configured with the holes and spokes or in a solid configuration with no holes or spokes. While the flexure promoting features of the upper support pad 44 are shown and described as being the holes 44H and the spokes 44A-D, the present invention is not limited in this regards as the flexure promoting features may be of other configurations, including but not limited to slits extending partially or entirely through the upper support pad 44, variations and non-uniform thickness of the upper support pad 44 and a support pad assembly formed of two or more separate pieces.

Figure 1:
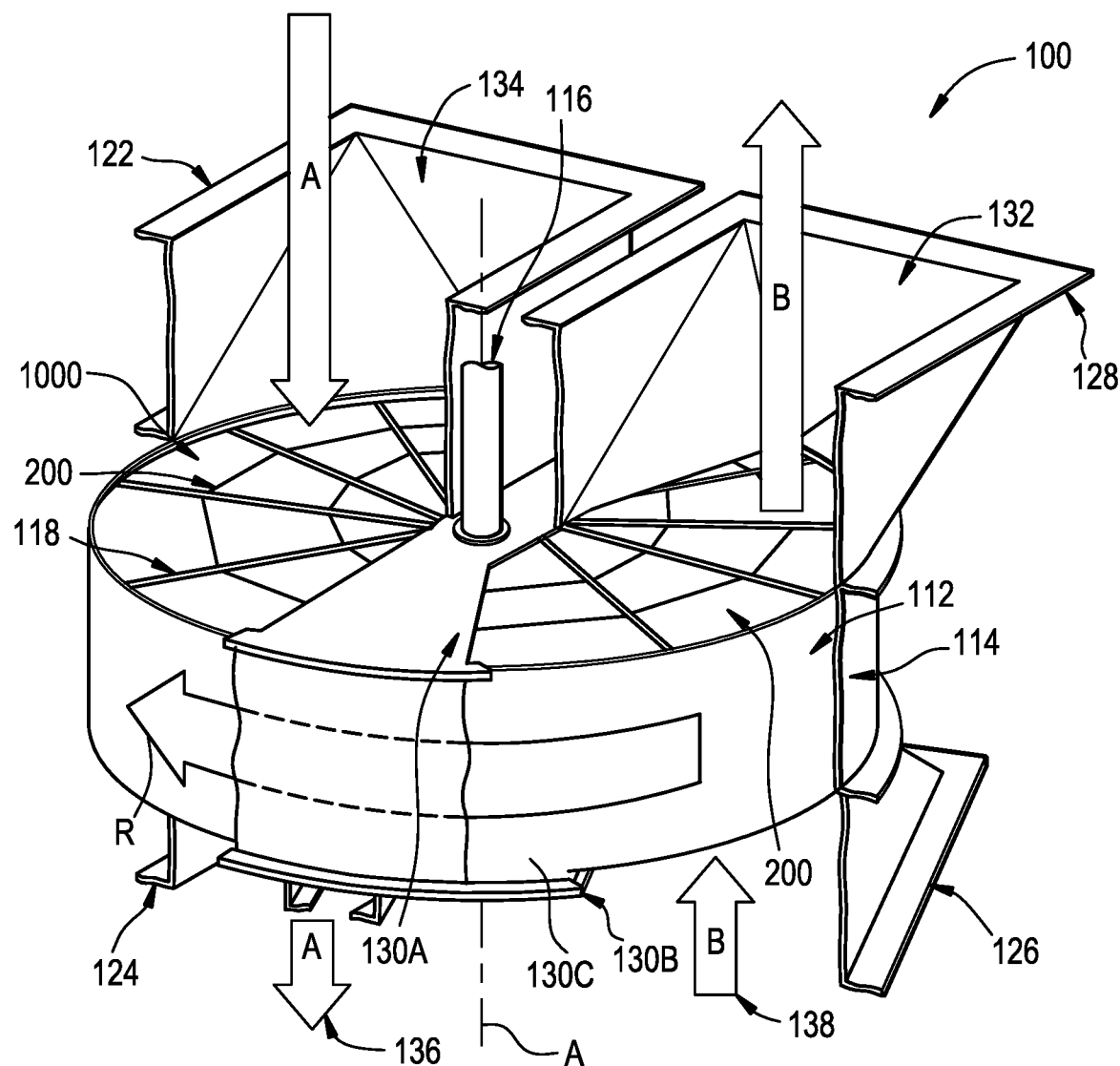
FIG. 1 is a schematic perspective view of a prior art rotary preheater.
Figure 2:
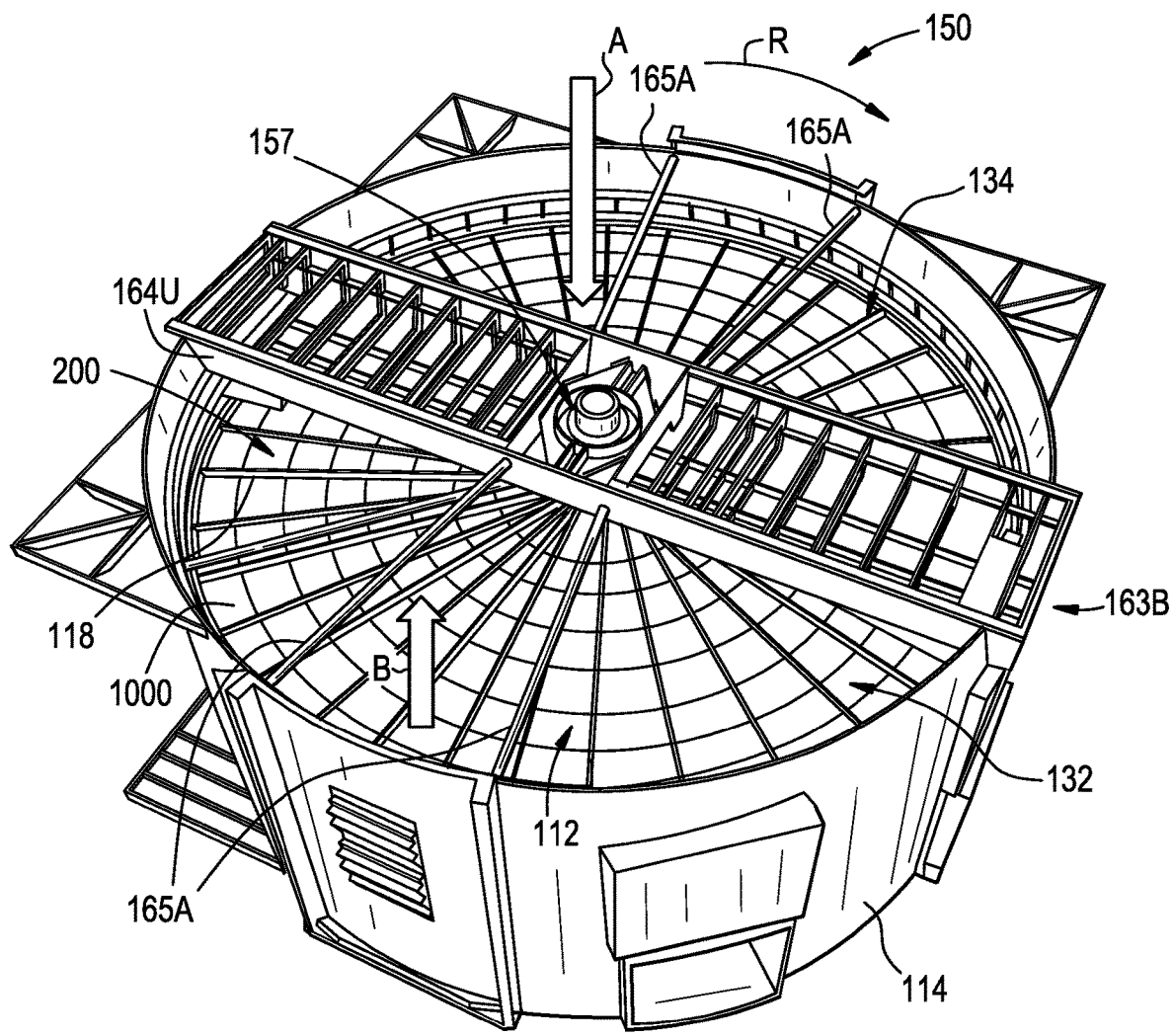
FIG. 2 is a schematic perspective view of a prior art rotary preheater shown mounted in a prior art structural support frame, shown without the ducting.

As shown in FIGS. 6A and 6B an upper bearing 43 (e.g., a radial bearing) is disposed in a first rotor assembly support area 299U that is in the first central opening 47 and is accessible through the second central opening 48. The upper bearing 43 and the first rotor assembly support area 299U are located radially inward in the direction of the arrow R20 of a peripheral circumferential boundary 10P of the support structure 10. The upper bearing 43 and the first rotor assembly support area 299U are located axially below an upper axial boundary 10Q of the upper section 10U of the support structure 10, in the direction of the arrow R21, of the support structure 10P, thus eliminating the need for a cumbersome center horizontal support assembly 164U, 164L of the prior art rotary exchange shown in FIGS. 2 and 3. The upper bearing 43 includes an inner ring 43A and an outer ring 43B. The inner ring 43A and the outer ring 43B are concentric with each other and the post assembly 80, which extends through inner ring 43A, and through the first central opening and is secured to the inner ring 43A (e.g., welded, bolted or coupled to). Thus, the shaft 80U rotates with the inner ring 43A. Each of the inner ring 43A and the outer ring 43B include a raceway 43R extending circumferentially therearound. A plurality of rolling elements 43E are disposed between the inner ring 43A and the outer ring 43B in rolling engagement with raceways 43R. The outer ring 43B is in fixed relation to the upper gusset pattern 45A, 45B, 46A, 46B and the upper support pad 44, as described herein. A locking collar 41 is secured to (e.g., welded, bolted or coupled to) the upper gusset pattern 45A, 45B, 46A, 46B and the upper support pad 44. In one embodiment, the locking collar 41 is secured to the upper support pad 44 at the first central opening 47. In one embodiment, the locking collar 41 is also secured to supplemental upper support pad 44'. The locking collar 41 includes a lip 41L to support the upper bearing 43 between the first central opening 47 and the second central opening 48. The lip 41L includes an axial face 41F that engages the outer ring 43B from below. A locking sleeve 43L secures the outer ring 43B locking collar 41. The locking sleeve 43L is positioned to define a bearing support pocket 43P axially disposed between the locking sleeve 43L and the lip 41L. The locking sleeve 43L is secured, e.g., fastened, to the upper support pad 44. The upper bearing 43 is positioned within the bearing support pocket 43P, where axial movement of the upper bearing 43 is substantially prevented via engagement with the locking sleeve 43L and the lip 41L.

A removable top cover 49 is positioned over the upper bearing 43, over first central opening 48 and is connected to the support pad 44. The removable top cover 49 includes a cylindrical body portion 49B having a top 49T, the removable top cover 49 has an opening 49P or multiple openings enabling communication between the environment and the upper bearing 43 without removing the removable top cover 49. The removable top cover 49 can also be displaced, e.g., removed, allowing access to the second central opening 48 for maintaining, e.g., lubricating, and/or replacing the upper bearing 43. The trunion 80U extends through inner ring 43A to the post assembly 80. The trunion 80U includes an end 80A that is secured to (e.g., welded, bolted or coupled to) a surface 80Y of the post assembly 80.

Figure 8B:
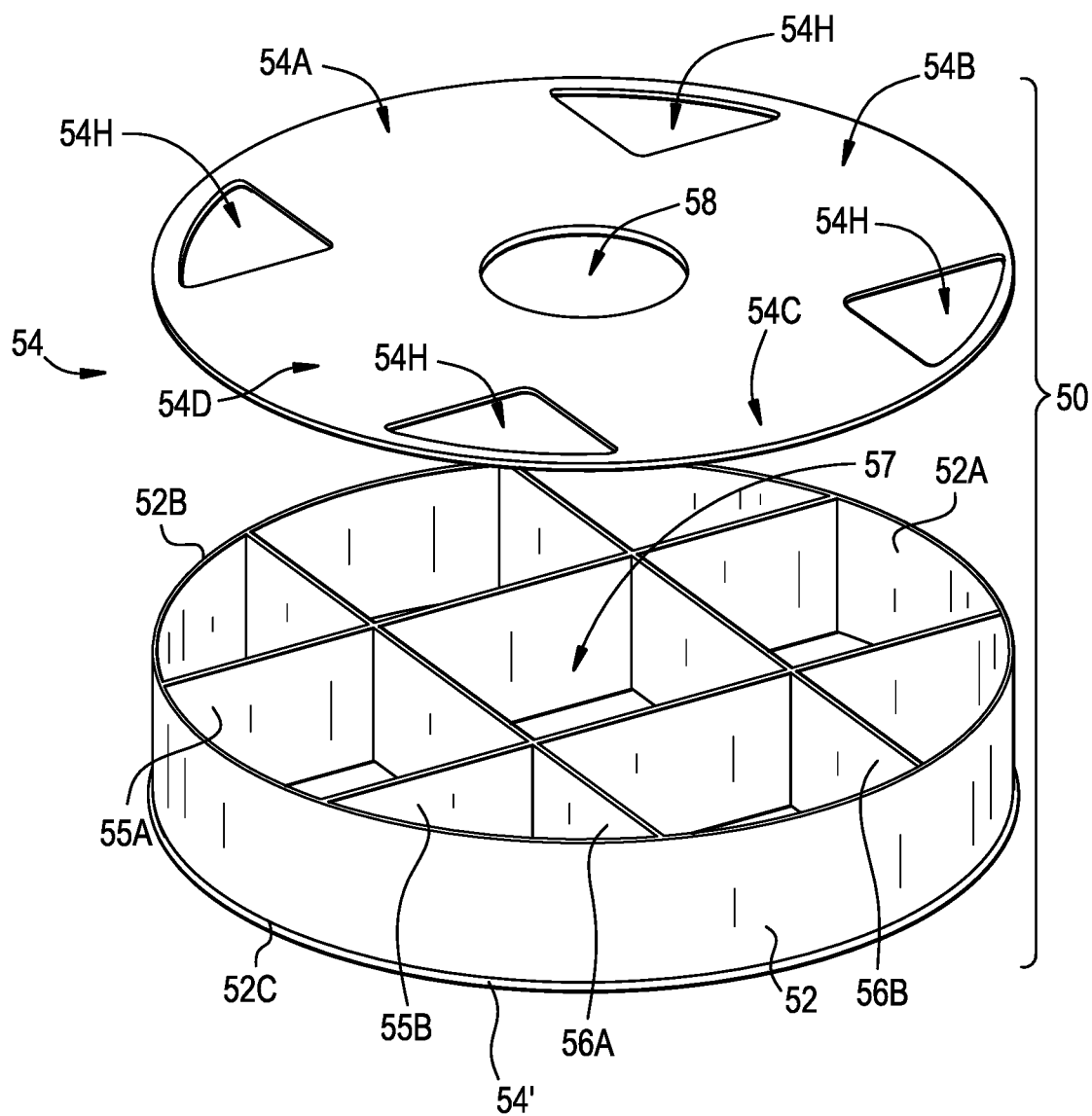
FIG. 8B is an enlarged exploded view of the lower hub portion of the rotary regenerative heat exchanger support structure of FIG. 5A.

As shown in FIGS. 7 and 8B, the lower hub 50 includes a lower hub body 52 (e.g., a hollow cylindrical shell) having an lower gusset pattern 55A, 55B, 56A, 56B attached therein and with a third central opening 57 extending through the lower gusset pattern. In one embodiment, the lower gusset pattern 55A, 55B, 56A, 56B includes a crisscross arrangement of plates attached (e.g., welded) to one another and to an inside surface 52A of the lower hub body 52. The lower hub 50 includes a lower support pad 54 extending over and attached to (e.g., welded to an upper axial end 52B) the lower hub body 52. The lower support pad 54 has a fourth central opening 58 extending therethrough. In one embodiment, the lower support pad 54 is not secured to the lower gusset pattern 55A, 55B, 56A, 56B and thus allows the lower support plate 54 to flex relative to the lower hub body 52 upon application of a load thereto. In one embodiment, as illustrated in FIG. 8B and to facilitate such flexure, the lower support pad 54 is provided with flexure promoting features in the form of exemplary cut out holes 54H (e.g., four holes shown) which form four spokes 54A, 54B, 54C and 54D that are generally coextensive with adjacent parallel portions of members of the upper gusset pattern 55A, 55B, 56A, 56B to be vertically supported thereby. In one embodiment, the lower support pad 54 is fixedly secured (e.g., welded) to the lower gusset pattern 55A, 55B, 56A, 56B and thus provides rigidity to the lower hub body 52 upon application of a load thereto. A second support pad 54' can be fixedly secured to a lower axial end 52C of the lower hub body 52 to add further rigidity to the lower hub body 52 and provide a receiving area 298A for pillars 254A or other support members. While the lower support pad 54 is shown and described as having the holes 54H and the spokes 54A-D, the present invention is not limited in this regard as the lower support pad 54 may have more holes and spokes or may be solid. The second support pad 54' may be configured similar to the lower support pad 54 and configured with the holes and spokes or in a solid configuration with no holes or spokes. While the flexure promoting features in the lower support pad 54 are shown and described as being the holes 54H and the spokes 54A-D, the present invention is not limited in this regards as the flexure promoting features may be of other configurations, including but not limited to slits extending partially or entirely through the lower support pad 54, variations and non-uniform thickness of the lower support pad 54 and a support pad assembly formed of two or more separate pieces. The ratio of the lower hub 50 outside diameter D6 (D6 shown on FIG. 7) to the lower ring 30 inner diameter D2 (D2 shown on FIG. 4A) is between 1 to about 5.5 and 1 to about 6.5.

As shown in FIGS. 6A and 10, a lower bearing support 254 has a top portion 254T and a base 254K. The lower hub 50 (e.g., the second support 54') is seated on and secured to (e.g., welded, bolted or coupled to) a plurality of support pillars 254A (four pillars shown, for example) which are seated on and secured to (e.g., welded, bolted or coupled to) the top portion 254T of the lower bearing support 254. A shaft or rotor post 80L extends through the lower hub 50 (i.e., through the third central opening 57 in the lower gusset pattern 55A, 55B, 56A, 56B; through the a fourth central opening 58 in the lower support pad 54; and another opening in the second support pad 54') and through an opening 59Z in a lower bearing housing 59. The lower bearing housing 59 includes side walls 59Y and a cover 59X that has the opening 59Z therein. The lower bearing housing 59 contains and protects a thrust bearing 256 from debris and contamination. The lower bearing housing 59 is seated in second rotor assembly support area 299L that is located below the lower hub 50 (i.e., below the third central opening 57 in the lower gusset pattern 55A, 55B, 56A, 56B) and is secured to (e.g., welded, bolted or coupled to) the lower bearing support 254. The shaft 80L includes an end 80B that is secured to (e.g., welded, bolted or coupled to) a surface 80Z of the post assembly 80 so that the shaft 80L is rotatable with the post assembly 80 and the trunion 80U. The lower bearing support 254 includes a support body 254B extending therearound, such as a square-shaped or cylindrical support body 254B.

As shown in FIGS. 6A and 10, the lower bearing housing 59 has the thrust bearing 256 mounted therein. The thrust bearing 256 includes an inner ring 256A with an outer ring 256B extending circumferentially therearound. The inner ring 256A and the outer ring 256B include a raceway 256R, 256R', respectively, extending circumferentially therearound. A plurality of rolling elements 256E are disposed between the inner ring 256A and the outer ring 256B in rolling engagement with raceways 256R, 256R'. The inner ring 256A is secured to (e.g., welded, bolted or coupled to) a lower end 80C of the shaft 80L, such that rotation of the inner ring 256A rotates the shaft 80L. The outer ring 256B is in secured to (e.g., welded, bolted or coupled to) and is in fixed relation with the top portion 254T of the lower bearing support 254.

The plurality of support pillars 254A connect the lower hub 50 to the lower bearing support 254 to distribute the weight of the support structure 10 around the thrust bearing 256 and maintain the thrust bearing 256 in alignment with the shaft 80L. Similarly, a foundation support system 254F is provided at a base 254K of the lower bearing support 254 to distribute weight from the support structure 10 above, transmit the weight of the support structure to the foundation 254X and maintain alignment between the thrust bearing 256 and the shaft 80L. For example, the foundation support system 254F includes support pads 254P disposed between the with the base 254K and a horizontal support structure 254H. The support pads 254P are in engagement (e.g., sliding engagement or fixedly engaged) with the base 254K of the lower bearing support 254 and the horizontal support structure 254H. The foundation support system 254F also includes a plurality of pillars 254G (e.g., four pillars shown) that extend between and fixedly secure the horizontal support structure 254H to the foundation 254X. Additional axially and radially extending support structures (not shown) can be included without departing from the embodiments of the present disclosure. The (1) the lower bearing support 254; (2) the foundation support system 254F; (3) the support pads 254P; (4) the lower bearing support 254; (4) the horizontal support structure 254H; and (5) the pillars 254P cooperate with the second rotor assembly receiving area 299L to rotationally support the rotor assembly 90 in the support structure 10. The second rotor assembly receiving area 299L is located radially inward in the direction of the arrow R20 of a peripheral circumferential boundary 10P of the support structure 10P. The second rotor assembly support area 299L is located axially below an upper axial boundary 10Q, in the direction of the arrow R21, of the support structure 10P, below the upper section 10U, below the lower hub 50 and below the rotor 90.

As shown in FIGS. 6A and 10, the lower ring 30, the lower hub 50 and the lower spokes 65A-65N are provided with an axial support system 254F' to assist in the support of the weight of the support structure 10. For example, a horizontal support member 254M (e.g., a beam) extends radially from the lower hub 50 to the lower ring 30. An outboard support pad 254R is disposed between and engages (e.g., slidingly engages or fixedly engages) the horizontal support member 254M and on a receiving area 298R on an underside of the lower ring 30. An inboard support pad 254R' is located radially inward from the outboard support pad, is disposed between and engages (e.g., slidingly engages or fixedly engages) the horizontal support member 254M and a receiving area 298R' on an underside (e.g., the second support pad 54', the lower axial end 52C of the lower hub body 52 or the lower gusset pattern 55A, 55B, 56A, 45B) of the lower hub 50. The horizontal support member 254M is secured in fixed relation to the foundation 254X by pillars 254Q and 254Q'. In one embodiment, one or more (i.e., at least one) additional support receiving areas 298Z are located on an underside of the one or more (i.e., at least one) of the lower spokes 65A-N, for receiving a structural support 254Z, shown in dashed lines in FIG. 6A, that seats on the foundation 254X. In one embodiment, the receiving areas 298A, 298R and/or 298R' are seated directly on the foundation 254X that is configured with suitable elevations to engage the receiving areas 298A, 298R and/or 298R'. As shown in FIG. 6A, the receiving areas 298A, 298R and/or 298R' are located substantially radially inward in the direction of the arrow R20 of a peripheral circumferential boundary 10P of the support structure 10.

While the axial support system 254F' is shown and described for one circumferential location (i.e., at lower spoke 65A) relative to the support structure 10, the present invention is not limited in this regard, as the axial support system 254F' may be employed at more than one circumferential location, for example, located at two or more (e.g., at least two) circumferential locations, located at three or more (e.g., at least three) circumferential locations, or located and circumferentially aligned with one or more or each of the upper spokes 60A-60N and/or lower spokes 65A-65N and engaging one or more of the lower spokes 65A-65N or one or more circumferential locations on the lower ring 30 and/or the lower hub 50.

Figure 3:
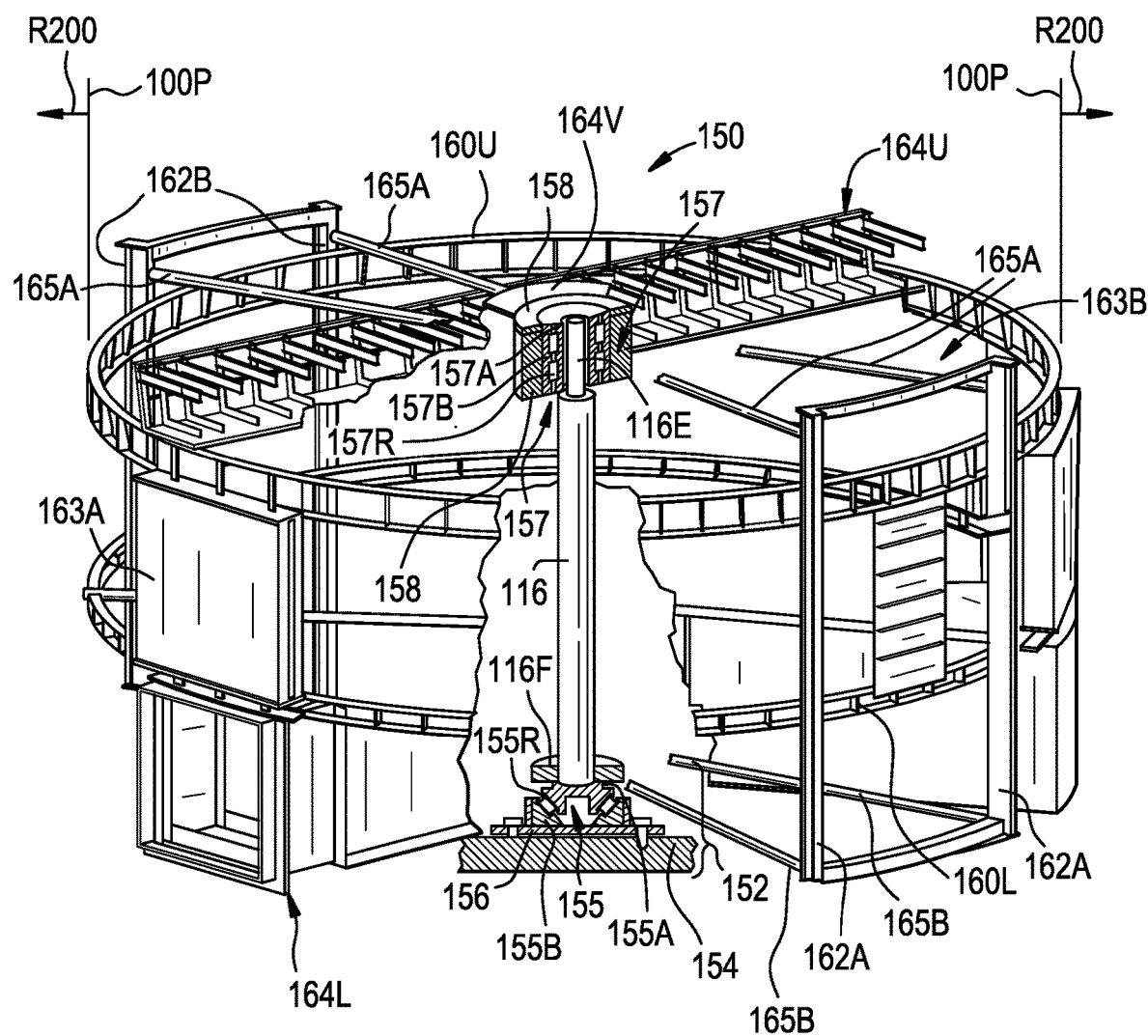
FIG. 3 is an exploded schematic perspective view of the prior art structural support frame of FIG. 2, shown without the rotary preheater and ducting.

As best shown in FIG. 6A, the entire compilation of: (1) the lower bearing support 254; (2) the foundation support system 254F; (3) the support pads 254P; (4) the lower bearing support 254; (4) the horizontal support structure 254H; (5) the pillars 254P; (6) the axial support system 254F'; (7) the outboard support pad 254R; (8) the inboard support pad and 254R'; (9) the horizontal support member 254M; and (10) the pillars 254Q, 254Q' are located radially inward from a peripheral circumferential boundary 10P of the support structure 10 as indicated by the arrow R20. Thus, the excessive space envelope problems associated with the prior art external support structures for installation of the conventional preheater 100, as described herein with reference to FIG. 3, are eliminated by the locating the compilation of support structures described herein with reference to FIG. 6A radially inward from a peripheral circumferential boundary 10P of the support structure 10.

While the compilation of support structures is shown and described as including: (1) the lower bearing support 254; (2) the foundation support system 254F; (3) the support pads 254P; (4) the lower bearing support 254; (4) the horizontal support structure 254H; (5) the pillars 254P; (6) the axial support system 254F'; (7) the outboard support pad 254R; (8) the inboard support pad and 254R'; (9) the horizontal support member 254M; and (10) the pillars 254Q, 254Q', the present invention is not limited in this regard as other support structure configurations that are located radially inward from a peripheral circumferential boundary 10P of the support structure 10 may be employed, including but not limited to a single unitary (e.g., integral) support structure.

Referring now to FIGS. 5A, 5B and 6A, the support structure 10 supports a rotor assembly 90 rotationally mounted therein. The rotor assembly 90 is sealed to the upper spokes 60A-N with a respective sealing assembly 555 and is sealed to the lower spokes 65A-N with a respective sealing assembly 555'. Each sealing assembly 555,555' is mounted to its associated spoke 60A-N, 65A-N with an associated seal portion thereof extending axially toward the rotor assembly 90 which is rotable thereunder or thereabove as the case may be. As shown in FIGS. 6A and 9A the upper spokes 60A-N and the lower spokes 65A-N have holes 66H extending therethrough with each providing access to a proximate one of a plurality of seal actuators (not shown) of the respective seals assembly 555 and 555' and which advantageously facilitate weight reduction without compromising structural integrity. However, the holes 66H are sealed to prevent leakage between adjacent free flow areas FA as shown in FIG. 4B. The rotor assembly 90 has radially extending compartments 92 which support heat transfer or reactant media 94, e.g., heat transfer sheets, heat transfer pads, heat transfer beads, adsorbents for $CO_2$ capture such as reticulated foams, granules, and structured adsorbents (e.g., parallel arrays of plate type adsorbents, short diffusion path adsorbents, and plate type adsorbents manufactured from adsorbent powder). The media 94 are closely stacked in spaced relationship within the radially extending media compartments 92 to form passageways between adjacent media 94. In one embodiment, the media 94 are removable from and replaceable in the radially extending compartments 92. Because the support structure 10 consistent with the embodiments of the present disclosure does not require or include the cumbersome center horizontal support assembly 164, the media 94 is less obstructed and access to the media 94 is increased. This increased access greatly increases the ease by which the media 94 is injected or placed in the media compartments 92, as well as maintained and replaced thereafter. During operation, air or gas flows through the passageways. The rotor assembly 90 is connected, e.g., welded or pinned, to the post assembly 80 at interior edge 92E for rotating therewith.

Referring back to FIG. 6A, in one embodiment, the support structure 10 for a rotary regenerative heat exchanger 1 includes the upper section 10U which includes the an upper ring 20 having a first and upright exterior surface 22, an upper hub 40 and three or more (i.e., at least three) upper spokes 60A, 60B, 60C each extending between and secured at respective ends thereof to the upper ring 20 and the upper hub 40. The support structure 10 includes a lower section 10L supportable in use by the axial support system 254F' (i.e., the outboard support pad 254R and the inboard support pad and 254R', both mounted on the horizontal support member 254M which is mounted on and supported by the pillars 254Q, 254Q'). The lower section 10L is spaced apart from the upper section 10U and is adapted in use to have compartments 92 of the rotor assembly 90 housed therebetween with such a rotor assembly having upper and lower center rotor posts 80U, 80L being rotatably mounted within the support structure 10 and with the upper rotor post 80U being supported by an upper bearing 43 mounted to the support structure 10 and a lower rotor post 80L being supported by a lower thrust bearing 256. The support structure 10 includes the plurality of support members 70 (e.g., upright vertical support members) each being fixedly secured directly (FIG. 4A) or indirectly (FIG. 11) to the upper ring 20 and the lower section 10L thereby spacing the upper ring 20 apart from the lower ring 30 and the lower section 10U. At least one of the upper spokes 60A-60N in use has a respective seal assembly 555, 555' (see FIG. 6A) mounted thereto and the upper hub 40 supports the upper bearing 43, such that the upper spokes 60A, 60B, 60C, the upper hub 40 and the upright support members 70 cooperate to provide rigidity to the support structure 10 adapted in use to transfer axial and/or torsional loads from the upper bearing and/or seal assembly to the lower section.

In one embodiment, the upper hub 40 includes the upper hub body 42 having the upper support pad 44 extending over and attached solely at or adjacent an axial periphery of the upper hub body 42 or a circumferentially peripheral wall of the upper hub body 42 of the upper hub 40, and a second central opening 48 extending through the upper support pad 44 wherein, in use, the upper rotor post extends through the first central opening 47 into the upper bearing 43 which is secured to and beneath the upper support pad 44 with the support pad 44 facilitating in use flexure thereof when axial loads are transferred from the upper bearing 43 to its attached outer periphery.

In one embodiment, axially inner ends of the upper spokes 60A, 60B, 60 are rigidly attached to the axial periphery of the upper hub body 40 and/or to part of the upper gusset pattern 45A, 45B, 46A, 46B.

In one embodiment, the lower hub 50 includes a lower hub body 52 (e.g., hollow cylindrical body) and has a lower gusset pattern 55A, 55B, 56A, 45B attached therein with a third central opening 57 extending through the lower gusset pattern and axially inner ends of the lower spokes 65A, 65B, 65) are rigidly attached to the axial periphery of the lower hub body 52 and/or to the or part of the lower gusset pattern 55A, 55B, 56A, 45B and in use with the lower end of the rotor post extending through the third central opening 57 and being supported by a lower bearing housing 59 disposed below and remote from the support structure 10.

Although the present invention has been disclosed and described with reference to certain embodiments thereof, it should be noted that other variations and modifications may be made, and it is intended that the following claims cover the variations and modifications within the true scope of the invention.

What is claimed is:

1. A support structure for a rotary regenerative heat exchanger, the support structure comprising:
   an upper section having an upper surface, the upper section comprising an upper ring having a first exterior surface, an upper hub and at least three upper spokes each extending between and secured at respective ends thereof to the upper ring and the upper hub;
   a first rotor assembly support area located substantially axially below an upper axial boundary of the upper ring and the upper spokes of the upper section of the support structure;
   an upper bearing disposed in the first rotor assembly support area;
   a lower section having a lower surface, the lower section configured to be supported by a foundation support system mounted on a foundation, with the lower section being spaced apart from the upper section; and
   a plurality of support members, each of the plurality of support members being fixedly secured, directly or indirectly, to the upper ring and the lower section thereby creating an annular space between the upper ring and the lower section, the annular space being configured to receive compartments of a rotor assembly;
   wherein the upper hub, the upper spokes and the support members cooperate to provide rigidity to the support structure such that the support members cooperate to support and transmit the weight of the upper spokes, the upper ring and the upper hub to the lower section,
   wherein the upper surface of the upper section and the lower surface of the lower section are axially spaced apart as defined by the length of each of the plurality of support members.

2. The support structure of claim 1, wherein the lower section comprises a lower ring having a second exterior surface, a lower hub and at least three lower spokes each extending between and secured at respective ends to the lower ring and the lower hub.

3. The support structure of claim 2, in which intermediate the foundation support system and the lower section is provided a plurality of outboard support pads disposed adjacent respective lower ends of one or more of the upright support members and/or a plurality of inboard support pads disposed beneath axially inner end portions of one or more of the lower spokes and/or beneath the lower hub.

4. The support structure of claim 2, wherein the lower ring comprises at least one lower radial opening extending therethrough and a lower extension portion of the at least one of the lower spokes extends through a respective one of the lower radial opening.

5. The support structure of claim 2, wherein a pair of the support members are secured to the upper ring at a junction of each of the upper spokes with the upper ring and to the lower ring at a junction of each of the lower spokes with the lower ring.

6. The support structure of claim 2, wherein at least one of the upper spokes and the lower spokes have at least one of a box shaped cross section and a tapered top profile expanding radially outward.

7. The support structure of claim 2, wherein the lower hub comprises a lower hub body having a lower support pad extending over and attached to the lower hub body, and a fourth central opening extending through the lower support pad.

8. The support structure of claim 2, wherein each of the lower spokes of the lower ring is adapted to have mounted thereon a sealing assembly which in use operatively and intermittently seals a rotor assembly thereto.

9. The support structure of claim 2, wherein the upper ring has a first axial thickness and the lower ring has a second axial thickness, a combination of the first thickness and the second thickness comprising an overall axial thickness of the support structure.

10. The support structure of claim 1, wherein at least one of the plurality of support members comprise a strut, a rod, a beam or a channel.

11. The support structure of claim 1, wherein the upper ring comprises at least one upper radial opening extending therethrough and an upper extension portion of the at least one of the upper spokes extends through a respective one of the upper radial opening.

12. The support structure of claim 11, wherein the at least one support member is secured to at least one of the upper extension portion and the lower extension portion.

13. The support structure of claim 1, wherein at least one of the upper ring and the lower ring has at least one of a box cross section, a radially inward opening C-shaped cross section and a radially outward opening C-shaped cross section.

14. The support structure of claim 1, wherein the upper hub comprises an upper hub body having an upper gusset pattern attached therein to an inside surface of a circumferentially peripheral wall thereof with a first central opening extending through the upper gusset pattern.

15. The support structure of claim 14, wherein at least one of:
(a) axially inner ends of the upper spokes are rigidly attached to at least one of:
the axial periphery of the upper hub body; and
part of the upper gusset pattern; and
(b) the lower hub comprises a lower hub body having a lower gusset pattern attached therein with a third central opening extending through the lower gusset pattern and axially inner ends of the lower spokes are rigidly attached to at least one of:
an axial periphery of the lower hub body; and
a part of the lower gusset pattern.

16. The support structure of claim 1, wherein the upper hub comprises an upper hub body having an upper support pad extending over and attached solely at or adjacent an axial periphery of the upper hub body or a circumferentially peripheral wall of the upper hub body of the upper hub, and a second central opening extending through the upper support pad, the upper support pad having flexure promoting features configured to cause the upper support pad to flex in response to loads applied thereto.

17. The support structure of claim 1, wherein each of the upper spokes of the upper ring is adapted to have mounted thereon a sealing assembly which in use operatively and intermittently seals a rotor assembly thereto.

18. The support structure of claim 1, further comprising a ratio of the overall axial thickness to the annular space is between 1 to about 2 and 3 to about 2.

19. The support structure of claim 1, further comprising a ratio of the annular space to one of the first axial thickness or the second axial thickness is between about 1 to 1 and about 3 to 1.

20. The support structure of claim 1, wherein the upper ring has a first outside diameter and the lower ring has a second outside diameter, the first outside diameter being substantially equal to the second outside diameter, and
wherein a ratio of the first or second outside diameters to the overall axial thickness is between about 3 to 1 and about 7 to 1.

21. A rotary regenerative heat exchanger comprising:
a support structure of claim 1;
a rotor assembly rotationally mounted in the support structure;
wherein the support structure comprises at least one of:
(a) foundation support receiving areas configured to receive the foundation support system, substantially all of the foundation support receiving areas being located substantially radially inward of a peripheral circumferential boundary of the support structure; and
(b) a second rotor assembly support area located substantially axially below an upper axial boundary of the upper section of the support structure.

* * * * *